US011514441B2

(12) United States Patent
Moss-Pultz et al.

(10) Patent No.: US 11,514,441 B2
(45) Date of Patent: Nov. 29, 2022

(54) SYSTEM AND METHOD FOR DECENTRALIZED TITLE RECORDATION AND AUTHENTICATION

(71) Applicants: Bitmark, Inc., Taipei (TW); Sean Moss-Pultz, Cardiff-by-the-Sea, CA (US)

(72) Inventors: Sean Moss-Pultz, Cardiff-by-the-Sea, CA (US); Casey Alt, Taipei (TW); Christopher Hall, Taipei (TW); Le Quy Quoc Cuong, Taipei (TW); Yu-Chiang Frank Wang, Taipei (TW); Tzu-Yun Eddie Lin, Taipei (TW)

(73) Assignee: BITMARK, INC., Taipei (TW)

( * ) Notice: Subject to any disclaimer, the term of this patent is extended or adjusted under 35 U.S.C. 154(b) by 0 days.

(21) Appl. No.: 17/181,889

(22) Filed: Feb. 22, 2021

(65) Prior Publication Data

US 2021/0201310 A1 Jul. 1, 2021

Related U.S. Application Data

(63) Continuation of application No. 15/092,551, filed on Apr. 6, 2016, now abandoned.
(Continued)

(51) Int. Cl.
*G06F 21/10* (2013.01)
*H04L 9/32* (2006.01)
(Continued)

(52) U.S. Cl.
CPC ......... *G06Q 20/3829* (2013.01); *G06F 21/10* (2013.01); *G06F 21/64* (2013.01); *G06Q 20/065* (2013.01); *G06Q 20/3825* (2013.01); *G06Q 20/3827* (2013.01); *H04L 9/3239* (2013.01); *H04L 9/3247* (2013.01);
(Continued)

(58) Field of Classification Search
None
See application file for complete search history.

(56) References Cited

U.S. PATENT DOCUMENTS 8,433,913 B2 * 4/2013 Takenaka .............. H04L 9/3247
713/179
9,224,196 B2 12/2015 Duerksen et al.
(Continued)

FOREIGN PATENT DOCUMENTS

WO 2014165925 A1 10/2014

OTHER PUBLICATIONS

Karafiloski, Elena and Anastas Mishev. "Blockchain solutions for big data challenges: A literature review." IEEE Eurocon 2017—17th International Conference on Smart Technologies (2017): 763-768. (Blockchain) (Year: 2017).*
(Continued)

*Primary Examiner* — Chikaodinaka Ojiaku
(74) *Attorney, Agent, or Firm* — Eleanor Musick; Torrey Pines Law Group PC

(57) ABSTRACT

A decentralized property system and method allow ownership rights to be transferred directly from one party to another without requiring a central authority to operate or secure the system. Digital signatures provide a method to issue and transfer titles ("bitmarks") within the system. Using a blockchain algorithm, distributed consensus on asset ownership can be achieved.

21 Claims, 13 Drawing Sheets

Related U.S. Application Data

(60) Provisional application No. 62/195,238, filed on Jul. 21, 2015, provisional application No. 62/143,771, filed on Apr. 6, 2015.

(51) Int. Cl.
| | |
|---|---|
| *G06Q 20/38* | (2012.01) |
| *G06Q 20/06* | (2012.01) |
| *H04L 9/40* | (2022.01) |
| *G06F 21/64* | (2013.01) |
| *H04L 9/00* | (2022.01) |

(52) U.S. Cl.
CPC ............ *H04L 9/3263* (2013.01); *H04L 63/12* (2013.01); *H04L 9/50* (2022.05)

(56) References Cited

U.S. PATENT DOCUMENTS

| | | | |
|---|---|---|---|
| 9,578,379 B1* | 2/2017 | Klappert | G06V 20/48 |
| 9,595,034 B2* | 3/2017 | Van Rooyen | G06F 21/10 |
| 10,129,238 B2* | 11/2018 | Kurian | H04L 63/0272 |
| 10,135,870 B2* | 11/2018 | Castinado | H04L 63/08 |
| 10,142,347 B2* | 11/2018 | Kurian | H04L 63/104 |
| 10,216,948 B2* | 2/2019 | Leporini | G06F 21/6209 |
| 10,320,564 B2* | 6/2019 | Vijayanarayanan | H04L 9/0866 |
| 10,361,869 B2* | 7/2019 | Gorman | H04L 9/321 |
| 11,044,356 B2* | 6/2021 | Powers | H04L 9/3213 |
| 11,074,663 B2* | 7/2021 | Rollins | G06Q 50/18 |
| 11,109,201 B2* | 8/2021 | Jahr | H04W 12/04 |
| 2004/0210756 A1 | 10/2004 | Mowers et al. | |
| 2005/0154889 A1 | 7/2005 | Ashley et al. | |
| 2006/0005237 A1 | 1/2006 | Kobata et al. | |
| 2006/0161788 A1 | 7/2006 | Turpin et al. | |
| 2007/0130464 A1 | 6/2007 | Swedor et al. | |
| 2008/0126805 A1 | 5/2008 | Owlett et al. | |
| 2010/0169653 A1* | 7/2010 | Takenaka | H04L 9/3247 713/176 |
| 2010/0185867 A1* | 7/2010 | Izu | H04L 9/3247 713/176 |
| 2010/0219251 A1 | 9/2010 | Decoux et al. | |
| 2010/0289627 A1 | 11/2010 | McAllister et al. | |
| 2012/0211564 A1 | 8/2012 | Callegari et al. | |
| 2012/0233704 A1* | 9/2012 | Sakumoto | H04L 9/3249 726/26 |
| 2012/0311655 A1* | 12/2012 | Hohlfeld | G06Q 50/184 726/1 |
| 2013/0046976 A1 | 2/2013 | Rosati et al. | |
| 2014/0095865 A1 | 4/2014 | Yerra et al. | |
| 2014/0281556 A1 | 9/2014 | Mao et al. | |
| 2014/0329497 A1* | 11/2014 | Sanzgiri | H04M 1/72412 455/26.1 |
| 2015/0127554 A1* | 5/2015 | Steif | H04M 3/42195 705/72 |
| 2015/0227926 A1* | 8/2015 | Grigg | G06Q 20/401 705/64 |
| 2015/0356523 A1* | 12/2015 | Madden | G06Q 20/383 705/76 |
| 2016/0196472 A1* | 7/2016 | Duerksen | G06V 20/80 382/145 |
| 2016/0203572 A1* | 7/2016 | McConaghy | G06Q 20/3827 705/58 |
| 2016/0217436 A1* | 7/2016 | Brama | G06Q 20/10 |
| 2016/0300234 A1* | 10/2016 | Moss-Pultz | G06Q 20/3829 |
| 2016/0353139 A1* | 12/2016 | Smith | H04N 21/233 |
| 2017/0193619 A1* | 7/2017 | Rollins | G06Q 50/184 |
| 2017/0230353 A1* | 8/2017 | Kurian | G06Q 20/405 |
| 2017/0230375 A1* | 8/2017 | Kurian | G06Q 20/382 |
| 2017/0243286 A1* | 8/2017 | Castinado | G06Q 40/00 |
| 2017/0244757 A1* | 8/2017 | Castinado | H04L 63/10 |
| 2017/0255922 A1* | 9/2017 | Jin | G06Q 20/3278 |
| 2017/0279801 A1* | 9/2017 | Andrade | H04L 63/0861 |
| 2017/0353311 A1* | 12/2017 | Schukai | H04L 9/3231 |
| 2018/0032383 A1* | 2/2018 | Surcouf | G06F 21/602 |
| 2018/0062848 A1* | 3/2018 | Gorman | H04L 9/3239 |
| 2018/0115426 A1* | 4/2018 | Andrade | H04L 9/30 |
| 2018/0181768 A1* | 6/2018 | Leporini | H04L 63/08 |
| 2018/0248699 A1* | 8/2018 | Andrade | H04L 9/0897 |
| 2018/0255055 A1* | 9/2018 | Andrade | H04L 63/0861 |
| 2018/0349894 A1* | 12/2018 | Patrinos | G06Q 20/383 |
| 2020/0044853 A1* | 2/2020 | Schukai | H04L 9/0618 |
| 2020/0280444 A1* | 9/2020 | Tang | H04L 9/3247 |
| 2020/0389467 A1* | 12/2020 | Ghat | H04L 9/3239 |
| 2021/0019754 A1* | 1/2021 | Muthukrishnan | G06F 21/554 |
| 2021/0117961 A1* | 4/2021 | Deshmukh | H04M 17/02 |
| 2021/0133743 A1* | 5/2021 | Bloy | G06Q 20/356 |
| 2021/0150599 A1* | 5/2021 | Kaja | G06Q 20/3672 |
| 2021/0158317 A1* | 5/2021 | Kurylko | G06Q 20/145 |

OTHER PUBLICATIONS

J. Wang, X. Shen and Y. Qi, "Method to Implement Hash-Linking Based Content Integrity Service," 2008 Second International Conference on Genetic and Evolutionary Computing, 2008, pp. 24-27, (Hash Linking). (Year: 2008).*

Antonopoloulos, Andreas M., "Mastering Bitcoin—Unlocking Digital Cryptocurrencies" Dec. 20, 2014, 298 pages.

EP16777222 Extended European Search Report and Written Opinion; dated Oct. 9, 2018, 8 pages.

PCT/US2016/026266 International Search Report and Written Opinion, dated Jul. 14, 2016, 8 pages.

* cited by examiner

THINGS FELL APART     June 20, 2016 22:34 UTC

*A novel by Amanda*

*Satis argumenti est ab interitu naturam abhorrere. Omnium enim rerum principia parva sunt. Satis argumenti est ab interitu naturam abhorrere. Omnium ...*

To: Freddie     Fee: .05 USD     [ SUBMIT ]

PROVENANCE:

| | |
|---|---|
| Eva (You) | March 20, 2016 – 10:29 UTC |
| Dylan | December 22, 2015 – 4:48 UTC |
| Chloe | September 23, 2015 – 8:21 UTC |
| Amanda | December 20, 2012 – 23:59 UTC |

View other issuances

| | | |
|---|---|---|
| 400 → | 402 — [QR code] | THINGS FELL APART    June 20, 2016 22:34 UTC |
| | | *A novel by Amanda* |
| | | *Satis argumenti est ab interitu naturam abhorrere. Omnium enim rerum principia parva sunt. Satis argumenti est ab interitu naturam abhorrere. Omnium ...*    404 |

PROVENANCE:

| | |
|---|---|
| Freddie | June 20, 2016 -- 22:33 UTC |
| Eva (You) | March 20, 2016 – 10:29 UTC |
| 406 — Dylan | December 22, 2015 – 4:48 UTC |
| Chloe | September 23, 2015 – 8:21 UTC |
| Amanda | December 20, 2012 – 23:59 UTC |

View other issuances

SYSTEM AND METHOD FOR DECENTRALIZED TITLE RECORDATION AND AUTHENTICATION

RELATED APPLICATIONS

This is a continuation of application Ser. No. 15/092,551, filed Apr. 6, 2016, which claims the benefit of the priority of U.S. Provisional Application No. 62/143,771, filed Apr. 6, 2015, and U.S. Provisional Application No. 62/195,238, filed Jul. 21, 2015, each of which is incorporated herein by reference in its entirety.

FIELD OF THE INVENTION

The present invention relates to a system and method for recording and transferring ownership of property and more particularly to a decentralized system that does not require a centralized authority.

BACKGROUND OF THE INVENTION

One of the most important things a formal property system does is transform assets from a less accessible state to a more accessible state, so that ownership can be easily communicated and assembled within a broader network. Converting an asset into a property requires a complex system to record and organize the socially and economically useful attributes of ownership. The act of embodying an asset in a property title and recording it in a public ledger facilitates a consensus among actors as to how assets should be held, used, and exchanged. Except in periods of political instability, government and institutionally-run property systems provide trust and unlock significant value. Digitizing these records promises to increase efficiency and lower costs but leaves the system highly vulnerable to fraud and data loss.

For physical assets, ownership and the transfer thereof have traditionally been established through a central authority. For example, registration of rights in real property is recorded in a governmental office; registration of rights in a vehicle is processed through a department of motor vehicles. Even ownership of less-than tangible assets such as patents, trademarks and copyrights, can be recorded in a government office.

Forgery has been a serious issue in business marketing. Counterfeiting of manufactured goods is a worldwide problem, with recent studies estimating that 8% of the world's total GDP is now generated by the manufacturing and sales of counterfeit products. Many classes of counterfeit goods create substantial risks to public health including counterfeit pharmaceutical drugs, auto parts, pesticides, and children's toys. In addition, counterfeit computer chips, aerospace parts, and identification documents present significant risks to national security. Valuable items such as works of art, official documents, and luxury goods often require certain procedures or even expert verification of an item's authenticity. Many different approaches have been tried to uniquely identify and authenticate objects, including labeling and tagging strategies using serial numbers, bar codes, holographic labels, RFID tags, and hidden patterns using security inks or special fibers. All of these methods can be duplicated or tampered with, and many add a substantial extra cost to the production of the goods sought to be protected. Physical labels and tags can also be easily lost, modified, or stolen. As a result, performing material authentication for practical applications can be a very challenging problem.

The U.S. FBI has labeled counterfeiting as the "Crime of the 21st Century." in general, over $650 billion in global sales are lost to counterfeit goods annually. Counterfeiting costs U.S. businesses $200-250 billion annually. 92% of Fortune 500 companies are affected by counterfeiting. World Customs Organization and International Chamber of Commerce estimates that roughly 7-8% of world trade every year is in counterfeit goods. Counterfeiting impacts nearly every market and nearly every consumer, regardless of age, residence, or wealth. Counterfeit products include pharmaceuticals, where fake drugs have caused injury and death, information technology (IT) and electronics, including fake batteries, vehicle parts—both automotive and airplane, food, beverages and other consumables, e.g., tobacco and other agricultural products, consumer goods, including toys, clothing and accessories, furniture, fabrics, building materials, to name just a few. Even the defense technologies has been hit with counterfeit microchips.

Authentication alone is not enough to stop counterfeiting. Counterfeiters use a variety of strategies, including diverting unfinished products from factories that make authentic goods and adding their own counterfeit brand identifiers such as labels and tags. Counterfeit items can enter the supply chain at any point, including at the original manufacturing facility, at the shipper, in distribution, or in retail stores. Unless the manufacturer or supplier can identify exactly where and when the item entered the supply chain, identifying and eliminating the counterfeit goods can be almost impossible.

A desirable solution would be something akin to biometric methods for human identification and verification. Such a process would identify distinctive patterns or key features that could be used to uniquely authenticate an item. Once such patterns are extracted, together with proper hashing or encryption techniques, the resulting features can be compact yet non-replicable, thereby securing the authentication process without requiring additional human verification.

A number of solutions for object fingerprinting have been proposed. See, e.g., J. D. Buchanan, et al., "Forgery: "Fingerprinting" documents and packaging", *Nature* 436, 475 (28 Jul. 2005); W. Clarkson, et al., "Fingerprinting Blank Paper Using Commodity Scanners", *Proc. IEEE Symposium on Security and Privacy*, May 2009, pp. 301-314; A. Sharma, et al., "Paperspeckle: microscopic fingerprinting of paper", Proc. $18^{th}$ ACM Conf. Comput. Comm. Secur., pp. 99-110, 2011. The work described in these papers is generally directed to extracting and encoding the surface texture of objects. In addition, physical properties like textural randomness are further taken into consideration when encoding their extracted features. Nevertheless, the above solutions generally rely on sophisticated machinery settings or require precise alignment, making it impractical for widespread adoption. Accordingly, the need remains for a system and method for performing object authentication that is affordable and accessible to everyone from sophisticated art dealers to the average consumer.

Different approaches have been undertaken to provide solutions to the proliferation of counterfeit goods. One such example is Microsoft's RF-DNA project, which uses a technologically sophisticated certificate of authenticity (COA), an anti-counterfeiting device whose "signature" is difficult to copy but easy and convenient to authenticate. The proposed COA is a digitally signed physical object of fixed dimensions that has a random unique structure. Key among its requirements is that the COA be inexpensive to make and authenticate, but prohibitively expensive to replicate. Using radio-frequency electromagnetic "fingerprints" of dielectric and conductive resonators in the near-field is the technological basis of the proposed COA. DuPont™ offers its Izon® anti-counterfeiting technology, which uses a visual 3D hologram-based security system with an embedded image for labeling products.

Existing systems require centralized administration and sourcing of the security devices, which can limit accessibility for creation of records as well as for obtaining information about the record. Furthermore, when multiple administrative entities are available, and multiple standards are used for creation and retention of records, anyone seeking information about a particular item would need to know which standard is being used and would need to have decoding capability for every available standard.

Attempts to address the challenges to documenting ownership of digital assets, and the transfer of digital rights, i.e., digital tights management, or "DRM", have taken many different approaches. As described in U.S. Pat. No. 9,064,276, Amazon Technologies, Inc. describes a system that generates application-specific digital stores to allow end users to conduct transactions with other parties to buy, sell or trade content items (games, music, e-books, movies, etc.) associated with the application. The system relies on a centralized content management system through which time-limited authorization tokens are associated with the items to be transferred. If the tokens are not redeemed within the specified time period, no record of transfer is created in the central database.

Blockchain systems are global state systems wherein the global state is stored across a distributed number of devices. Examples are networks such as Bitcoin, Ripple, Namecoin, among others. A combination of public/private key cryptography and hash chains provides a mechanism to store arbitrary secure states as a single ledger—the blockchain—held at all distributed nodes. Nodes update their local state based on "proof of work" hashing algorithms applied to the system as a whole. These systems provide a secure mechanism for establishing shared common ground across many devices.

Berlin-based Ascribe provides a digital copyright and verification system that employs a cryptographic hash of the digital artwork that is recorded in a Bitcoin blockchain. Ascribe's approach, described in International Patent Publication No. WO 2015/024129, uses a hash of the artwork to generate an identifier that is a Bitcoin address. Transfers of the artwork are represented by Bitcoin transactions. Thus, the system is dependent on a specific crypto-currency standard and would not be compatible with other crypto-currencies. Further, the reliance on Bitcoin's elliptic curve cryptography results in a hash that is only 160 bits (first hash: SHA256; second hash: RIPEMD-160), which has been predicted to be vulnerable to hackers once quantum computers are available. Other companies, including Proof of Existence and Blocksign, among others, provide systems for hashing documents into the Bitcoin blockchain, generating a certificate of the existence of the document, akin to a notary service, allowing it to be verified later. As with Ascribe, employment of the Bitcoin blockchain limits the system to a single crypto-currency standard.

EverLedger records thousands of diamonds and their unique characteristics into the Bitcoin blockchain in an attempt to prevent fraud. Application to other high value luxury items whose provenance would otherwise be dependent on paper certificates is contemplated. At least for diamonds, inspection by an authorized laboratory is required to ensure consistency in the "fingerprint" for each stone. Such methods use the bitcoin script op code OP_RETURN. There is considerable developer concern regarding such approaches—storing arbitrary data in the blockchain widely considered a "bad idea". It is less costly and more efficient to store non-currency data elsewhere.

The need remains for a system that is widely available for virtually all potential users and is not dependent of any specific crypto-currency system or hashing method.

SUMMARY OF THE INVENTION

In an exemplary embodiment, a decentralized property system and method are provided to allow ownership rights to be transferred directly from one party to another without requiring a central authority to operate or secure the system. Digital signatures provide a method to issue and transfer titles ("bitmarks") within the system. Using a blockchain algorithm, distributed consensus on who owns what can be achieved. Digital assets can be uniquely identified by digital fingerprints using cryptographically-safe hash functions. Fingerprints computed from images of the asset may be used in a method to uniquely identify physical assets. In some embodiments, the unique identifier used for a physical asset may be a physical unclonable function, or "PUF." Title transfers are verifiable and create an unforgeable chain-of-ownership ("provenance").

Digital signatures and other methods like fingerprinting provide a method to issue and transfer titles ("bitmarks") using a blockchain algorithm similar to, but with significant differences from, that used for Bitcoin (see, Satoshi Nakamoto, "Bitcoin: A Peer-to-peer Electronic Cash System", available on the World Wide Web at bitcoin.org, incorporated herein by reference. A unified ledger that is independent of any crypto-currency is created. An Asset Record that includes specific attributes describing the property is created to digitally represent the asset. An Issue Record is then created to represent instances of the property linking to a specific Asset Record. A Transfer Record is created to record each ownership changes. The Transfer Records are chained together and the root is chained to the Issue Record, which is chained to the Asset Record. The bitmark is the chain of all records, which are stored in a bitmark blockchain. No crypto-currencies are generated during blockchain construction, nor are crypto-currencies used to represent transfers of ownership. Because the bitmark blockchain is independent of any particular crypto-currency system, hash functions from any secure hash algorithm family may be used, including SHA-2 and SHA-3.

Each Bitmark system user has an account that is associated with a unique number, for example, an Ed25519 public-key ("pubkey") pair, or other appropriate pubkey system, which allows the user to sign Issue and Transfer Records. The owner of the bitmark is identified by their pubkey. This differs from Bitcoin, which only has one type of address and signature because the bitmark account can support multiple types of signatures, including post-quantum computing algorithms such as SPHINCS.

In an aspect of the invention, encoded data derived from images of local regions of a physical object are used to securely reference ("fingerprint") physical assets based on unique surface-level texture patterns, rendering the physical asset traceable as a digital item. A cryptographically-safe hash function is used to fingerprint digital assets. The present invention provides a framework for authenticating different objects or materials via extracting and matching their fingerprints. Unlike biometric fingerprinting processes, which use patterns such as ridge ending and bifurcation points as the "interest points," an embodiment of the invention applies stereo photometric techniques for reconstructing local image regions of objects that contain the surface texture information. The interest points of the recovered image regions can be detected and described by state-of-the-art computer vision algorithms. Together with dimension reduction and hashing techniques, the inventive approach is able to perform object verification using compact image features for virtually any object, including documents, for practical physical object authentication tasks.

It should be noted that the techniques described herein are distinct from "Digital Rights Management" (DRM). Getting actors to respect the recorded property rights of others depends on the specific nature of the property and legal jurisdiction. The inventive system and method provide means to securely agree upon who owns what.

In one aspect of the invention, a method for recording ownership rights in an asset includes: using a computing device, generating an asset record having a fingerprint comprising a hash of a digital representation of the asset, a public key of a client who generates the asset record, and a digital signature comprising a private key of the creating client; using the computing device, communicating with one or more nodes of a peer-to-peer network to generate an entry in a public ledger by performing the steps of: generating at least one issue record comprising a double hash of the fingerprint, the public key of the creating client, and an owner signature comprising a hash of the digital signature of the creating client with the double hashed fingerprint and the public key of the creating client; and displaying the at least one issue record on the public ledger. In some embodiments, the asset is digital property selected from the group consisting of music, video, electronic books, digital photographs, digital images, and personal data. In another embodiment, the asset is physical property, and the method further includes generating a digital fingerprint corresponding to the physical property using a local image of a region of interest on a surface of the physical property. The local image may be a photometric stereo image from which the computing device identifies local interest points within the photometric stereo image using a keypoint detector; and encodes the local interest points as a binary string using a binary descriptor; wherein the binary string comprises the digital representation of the asset.

The method may further include generating a first transfer record for recording a transfer of the asset to a new owner, wherein the transfer record comprises a double hash of a complete issue record for the asset and a public key of the new owner, wherein the transfer record is digitally signed by the owner signature; using a blockchain algorithm to generate a distributed consensus of ownership of the asset associated with the owner signature to validate the first transfer record; and if the first transfer record is validated, displaying the transfer record on the public ledger; and if the first transfer record is not validated, rejecting the transfer record. In some embodiments, the method may further include, after the step of generating the first transfer record: displaying at the user interface a payment request; and determining whether a user payment has been remitted before proceeding with the step of executing.

The method may further include generating a subsequent transfer record for recording a transfer from a prior owner to a subsequent new owner, wherein the subsequent transfer record comprises a double hash of a prior transfer record, and a public key of the subsequent new owner, wherein the subsequent transfer record is digitally signed by the prior owner. In some embodiments, the method may further include, after the step of generating the subsequent transfer record: displaying at the user interface a payment request; and determining whether a user payment has been remitted before proceeding with the step of executing. In embodiments in which the at least one issue record comprises multiple issue records, each issue record includes a different nonce and is associated with a separate blockchain.

In another aspect of the invention, a system for recording ownership rights in an asset includes: a client computing device configured for generating an asset record having a fingerprint comprising a hash of a digital representation of the asset, a public key of a client who generates the asset record, and a digital signature comprising a private key of the creating client; a peer-to-peer network in communication with the client computing device to generate an entry in a public ledger by performing the steps of: generating at least one issue record comprising a double hash of the fingerprint, the public key of the creating client, and an owner signature comprising a hash of the digital signature of the creating client with the double hashed fingerprint and the public key of the creating client; and displaying the at least one issue record on the public ledger. The asset may be digital property selected from the group consisting of music, video, electronic books, digital photographs, digital images, and personal data. Alternatively, the asset may be physical property, where the client computing device is further in communication with a photometric stereo device configured for generating a digital fingerprint corresponding to the physical property using a local image of a region of interest on a surface of the physical property. The photometric stereo device is configured for identifying local interest points within the photometric stereo image using a keypoint detector; and encoding the local interest points as a binary string using a binary descriptor; wherein the binary string comprises the digital representation of the asset. The client computing device and the at least one node of the peer-to-peer network may be further configured for communicating for generating a first transfer record for recording a transfer of the asset to a new owner, wherein the transfer record comprises a double hash of a complete issue record for the asset and a public key of the new owner, wherein the transfer record is digitally signed by the owner signature; using a blockchain algorithm to generate a distributed consensus of ownership of the asset associated with the owner signature to validate the first transfer record; and if the first transfer record is validated, displaying the transfer record on the public ledger; and if the first transfer record is not validated, rejecting the transfer record. In some embodiments, the system may further comprise causing the at least one client computing device and at least one node to communicate, after the step of generating the subsequent transfer record, for displaying at the user interface a payment request; and determining whether a user payment has been remitted before proceeding with the step of executing.

The system may further comprise at least one second client computing device in communication with the peer-to-peer network for generating a subsequent transfer record for recording a transfer from a prior owner to a subsequent new owner, wherein the subsequent transfer record comprises a double hash of a prior transfer record, and a public key of the subsequent new owner, wherein system may further comprise causing the at least one second client computing device to, after generating the subsequent transfer record, display at the user interface a payment request; and determine whether a user payment has been remitted before proceeding with the step of executing.

BRIEF DESCRIPTION OF THE DRAWINGS

FIG. 9C compares the ROC curves for each approach.

DETAILED DESCRIPTION OF EXEMPLARY EMBODIMENTS

Figure 1:
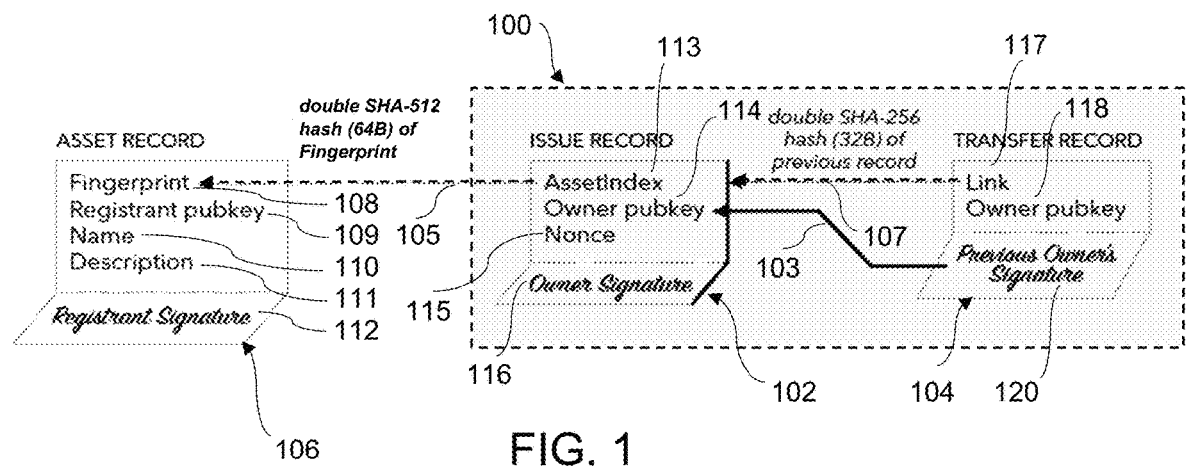
FIG. 1 is a block diagram of the inventive system.

For purposes of description of embodiments of the invention, the following definitions will apply:

"Account" means a public-private key pair that is used to identify property registration and ownership within the Bitmark system. The account identifier (ID), also referred to as a "public account number", or "Bitmark Account", is the public key. A single user may have multiple accounts within the Bitmark System. The account is an encoding form for a public key, i.e., an "account" in the Bitmark system. An account contains different information about the key. In an exemplary embodiment, the encoding form is a base58-encoding form.

"Asset record" means the blockchain data structure that immutably records the registration for a new property within the Bitmark system.

"bitmark" means a digital title that secures ownership to a specific physical or digital property within the Bitmark system. Transferring a bitmark from one owner to another transfers ownership of the specified property. A bitmark is represented in the blockchain via a chain of bitmark transfer records and the root issue record.

"Bitmark Transfer Record", or "BTR", means the blockchain data structure that represents a bitmark title.

"Issuance" means the process of creating new bitmarks for a digital property. Issuance is only applicable for digital properties and effectively creates more copies that can be owned within the Bitmark system. New bitmark issuances can only be made by the most recent registration transfer record owner.

"Key import format", or "KIF", means the encoding (base-58 or other) of a private key and some algorithm and checksum objects. A KIF may be used to import a bitmark account back to the client.

"Owner" means any user of the Bitmark system who holds the private key to at least one account. A Bitmark system user is said to "own a bitmark" is he or she holds the private key that corresponds with the owner public key field in the latest bitmark transfer record in the bitmark's chain of ownership.

"Passphrase" means the complex password used to access a user's keystore. While the Bitmark Account identifies which synced keystore belongs to a user for local download, the passphrase allows the user to decrypt the local keystore and access the private keys for each of their accounts. Both a Bitmark Account ID and a passphrase are required to log in to the Bitmark client app. The passphrase is also required anytime a secure transaction is initiated within the client.

"Property" means a unique digital presentation (hash) of a physical or digital item. The property hash is generated during the registration prices for a new property. As part of the registration record, the property hash is permanent and immutable.

"Registrant" means the bitmark account used to create a registration for a new property, the asset record, in the Bitmark system. More specifically, the account's public key is immutably recorded in the asset record's "registrant" field, and the account's private key is used to sign the asset record. For physical properties, the registrant is also the owner of the initial bitmark transfer record. For digital properties, the registrant is the owner of the initial registration transfer record.

"Registration" means the process of adding a new physical or digital property to the bitmark blockchain. Registration permanently binds a property to a registration record within the blockchain. A registration is created by a registrant and is recorded in the blockchain as a registration record. The registration record serves as the base element for a property's entire bitmark chain.

"Registration transfer record", or "RTR", means the blockchain data structure that represents the current owner of a property registration. RTRs exist only for digital properties. Ownership of a registration transfer record grants bitmark issuance capability to the owner. The only technical difference between a registration transfer record and a bitmark transfer record is the type of property.

"Transaction" means any of the three main bitmark processes: registration, transfer, and issuance.

"Transfer" means a change of ownership from one Bitmark account to another. A transfer may apply to either a BTR or a RTR. A transfer transaction creates either a new BTR or RTR that is signed with the old owner's private key and assigned to the new user's public key. A chain of transfer records constitutes a registration, or bitmark's chain-of-ownership, within the bitmark blockchain.

According to embodiments of the present invention, a decentralized property system and method allow ownership rights to be transferred directly from one party to another without requiring a central authority to operate or secure the system, and without reliance on an existing crypto-currency system. Digital signatures provide a method to issue and transfer titles ("bitmarks") within the system. Using a blockchain algorithm, distributed consensus on who owns an asset can be achieved, in a manner similar to that used for Bitcoin and other crypto-currencies. Digital assets can be uniquely identified using cryptographically-safe hash functions. Fingerprints derived from local images of the physical asset can be used to uniquely identify the physical asset. Title transfers are verifiable and create an unforgeable chain-of-ownership ("provenance").

In one aspect of the invention, encoded data derived from images of local regions of the surface of a physical object are used to securely reference ("fingerprint") physical assets based on unique surface-level texture patterns. A cryptographically-safe hash function is used to fingerprint digital assets. Scarcity of digital properties is possible and can accommodate the conceptual and legal frameworks of the physical world.

To begin use of the Bitmark system, a user, or "client", first needs to create an account. The client may logs onto the Bitmark system using a web-based application stored or accessed using a desktop or other personal computing device, or using a mobile device with a "Bitmark App". For purposes of the description of the Bitmark system, such devices will be referred to generally as "computing devices." A set-up wizard guides the user through the steps of creating a new account. First, an account number is assigned. In an exemplary embodiment, a unique 50 character Bitmark account number is used to identify the user and his or her properties (assets) within the Bitmark system. The account number is the identifier that the client gives to other Bitmark users to transfer bitmarks into the client's account. The account number will remain accessible on the computing device from the client's settings page.

The next step in creating a Bitmark account involves generating and storing the client's private key, which also occurs on the client's computing device, i.e., not at the Bitmark system server (the "bitmarkd server"). In an exemplary embodiment the private key is a 54 character string that is used to access the client's account and control the assets for which bitmarks have been created. The Bitmark account is then generated from the client's private key. In addition to controlling the client's assets, the private key provides means for the Bitmark software to recover the account in the event the client's computing device is lost or damaged. Because the bitmarkd server does not generate or store the private key, the set-up wizard instructs the user to save the private key in a safe place, separate from the computing device, then instructs the user to enter the private key for verification. After verification of the private key, the user is instructed to enter a passcode that can be used, when using the same computing device, as a shortcut for entering the user's private key. Once the passcode is entered and verified, the Bitmark software initializes the new account corresponding to the user's account number. The user is now ready to begin recording of his or her assets in the Bitmark system.

Referring to FIG. 1, a bitmark 100 is defined as a digitally signed chain consisting of a single Issue Record 102 and one or more Transfer Records 104, which may be either a BTR or RTR. An Asset Record 106 contains metadata for a physical or digital asset as well as the unique asset fingerprint used to identify it within the Bitmark system. Each Asset Record 106 includes the following fields: a "fingerprint" 108, which is a hash of a digital representation of a physical object or digital file; a registrant 109, which is a public key (ED255194) of the registrant; (3) a "name" 110, a short UTF-8 identifier; (4) a "description" 111—identifying UTF-8 text; and (5) a "signature" 112, a hash of fields 108-111 signed by registrant's private key.

An Issue Record 102 creates a new bitmark from an Asset Record 106. Issue Records 102 include the following fields: "AssetIndex" 113, a double SHA-512 hash (64 bytes) of the corresponding Asset Record 106's fingerprint 108 value. The AssetIndex 113 serves as a unique identifier for the Asset Record 106 and will be identical across all Issue Records 102 for the same Asset Record 106. The Asset Record Fingerprint 108 is hashed twice as a means for guaranteeing a consistent size regardless of the original size of the Fingerprint value. Also included in the Issue Record 102 is the Owner pubkey 114. In some embodiments, Owner pubkey 114 is a public key (ED25519) of the user who created the issuance. As will be apparent to those in the art, other public keys, such as Ed25519+SPHINCS, may be used. When a new issuance occurs, the Issue Record 102 is automatically owned by the issuer. A Nonce 115 is an unsigned integer that serves as a unique number to distinguish multiple issuances of the same asset. The Issue Record 102 also includes a Signature 116, which is a hash of fields 113-115 signed by the issuer's private key.

A bitmark technically requires only an Issue Record 102. Transfer Records are not required. A bitmark without any Transfer Records simply belongs to the original bitmark issuer. If the bitmark issuer never transfers the bitmark to another owner, the bitmark's chain-of-ownership will never grow beyond the initial Issue Record.

A Transfer Record 104 transfers ownership of a bitmark and includes the following fields: A Link 117, which is a double SHA-256 hash (32 bytes) of the entire previous record (including signature 116), which indicates the previous record in a bitmark's chain-of-ownership. The previous record may be either an Issue Record 102 or another Transfer Record 104. The previous record is hashed twice as a means for guaranteeing a consistent size regardless of the original size of the previous record. Also included in the Transfer Record 104 is the Owner pubkey 118, the public key (ED25519) of the bitmark transfer recipient, and the Previous Owner's Signature 120, a hash of fields 117 and 118, signed using the private key of the previous record's owner 120.

A Transfer Record 104 has both a Reference Chain connection 107 and a Signature Chain connection 103. The value of Link 117 corresponds to Reference Chain connection 107, which is a double SHA-256 hash of the entire preceding record. The Link 117 is what points to the preceding record in the bitmark chain. The Signature Chain connection 103 to the previous record (issue or transfer) requires the owner of the previous record to digitally sign the subsequent Transfer Record 104 using his or her private key.

One practical implication of the distinction between the Reference Chain 107 and the Signature Chain 103 is that there is no digital signature connection between an Asset Record 106 and Issue Records 103 connected to that Asset Record. The public key owner specified in the Registrant field 109 of the Asset Record only signs the Asset Record 106 itself and is not required to sign any subsequent Issue Records. This means that any user can issue new bitmarks for an asset since an Issue Record is self-signed by the user who issues it, not by the original asset registrar. By contract, Transfer Records must be signed using the private key of the previous record's owner. Since the bitmark's current owner is the only user who is authorized to transfer the bitmark to another user, the Signature Chain provides cryptographic proof of the transfer authorization.

The bitmark's current owner (the rightmost record in the chain) is verified by checking the digital signatures in the chain. Whereas a Transfer Record's Link field 117 establishes a Reference Chain 107 to the previous record, the Transfer Record's Signature value determines whether the Transfer Record 104 is actually valid. If a Transfer Record's digital signature matches the public key of the previous record's Owner, the Transfer Record is considered valid and is recorded in the blockchain. If not, the invalid Transfer Record is rejected from the blockchain. The original Asset Record 106 is verified by validating its reference Fingerprint 108 against the actual object. The system protects against other invalid transactions (e.g., double-transfers) through a distributed timestamp server.

Still referring to FIG. 1, the Reference Chain 105 connection means that the Issue Record's AssetIndex 113 points back to the corresponding Asset Record's Fingerprint value 108. This is distinct from the Signature Chain 103 that connects the Previous Owner's Signature 120 to the Owner pubkey 114. This connection requires the private key signature of the owner of the immediate prior record in the chain.

Figure 2:
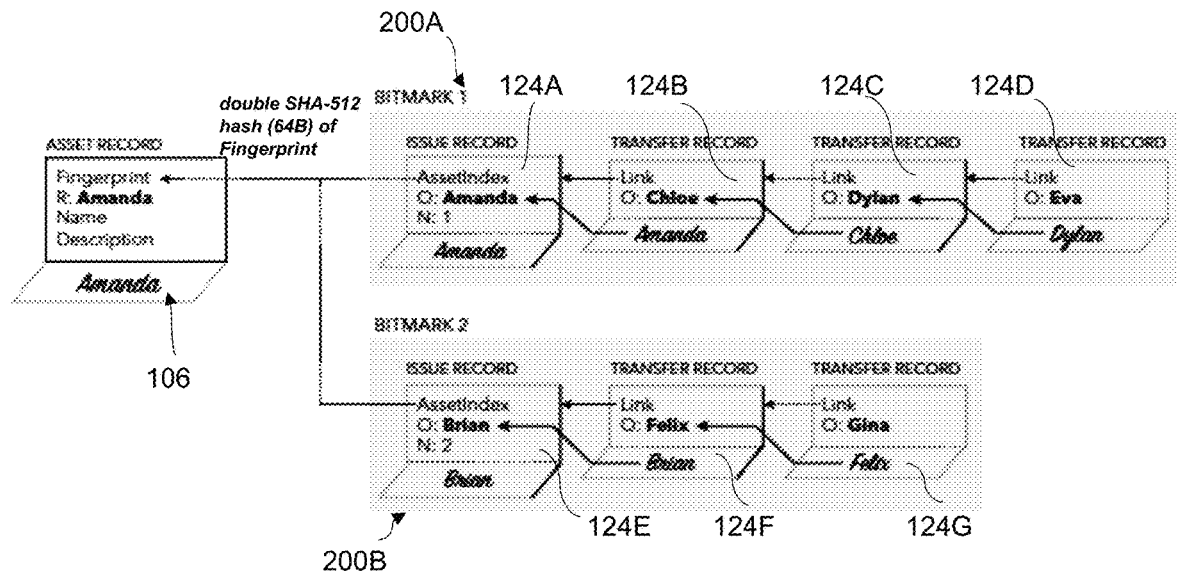
FIG. 2 is a block diagram of an embodiment of the system showing multiple transfer records.

Asset Records 106 are self-signed. Thus, any user can issue new bitmarks for an asset, as shown in FIG. 2. In this case, "Eva" and "Gina", the Owner pubkeys shown in the right-most Transfer Records 124D and 124G, are both current owners (since they hold the last transfer records in their respective bitmark chains (also referred to simply as "bitmarks") 200A and 200B). Conflicting ownership claims stemming from bitmarks that point to the same asset yet have different issuing signatures must be settled externally by property rights enforcers. As an immutable, enduring history of all property transactions, bitmarks 200A and 200B will serve as evidence.

Example 1—Sample Digital Asset Data Structure

The following example illustrates the transactions occurring according to a basic data model of the Bitmark system. The example, which is provided for illustrative purposes only, consists of one asset, three bitmarks for the asset, and twelve different bitmark users.

Figure 3A:
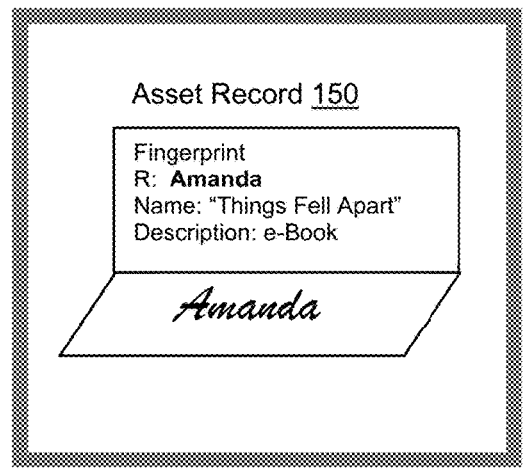
FIG. 3A is a block diagram of an initial transaction to create an Asset Record.

Referring to FIG. 3A, the example begins with transaction #1 in which user #1, "Amanda", registering a new asset in the Bitmark system by creating a new Asset Record 150. For purposes of this example, the asset is Amanda's new self-published suspense e-book entitled "Things Fell Apart". While it might be possible for Amanda to use the entire e-book for creating a fingerprint, she may choose only to generate a unique description of the book, e.g., something as simple as the title, her name, and date of publication, or select recognizable excerpts of the book, e.g., selected pages. By accessing a bitmark Issuance User Interface ("UI"), Amanda's selected digital file is copied, e.g., dragged and dropped, or selected by browsing the user's files, and loaded via the UI into the Bitmark system to hash the file to compute the asset's unique Fingerprint. The user interface may display an animation such as a clock, hourglass or rotating wheel while the Fingerprint is generated. Once the fingerprint has been computed, a push notification may be sent. If the Fingerprint value does not already exist in the Bitmark system, a new Asset Record 150 is created. If the Fingerprint value already exists within the Bitmark system, Amanda would instead presented with the option to issue new bitmarks for the asset, however, these would be considered additional, new assets.

The Registrant (second) field of the Asset Record 150 displays Amanda's public key (her name, indicated in bold font). The Asset Record is also signed using Amanda's private key. Thus, the Asset Record is "self-signed" by the person who registers the new asset.

Figure 3B:
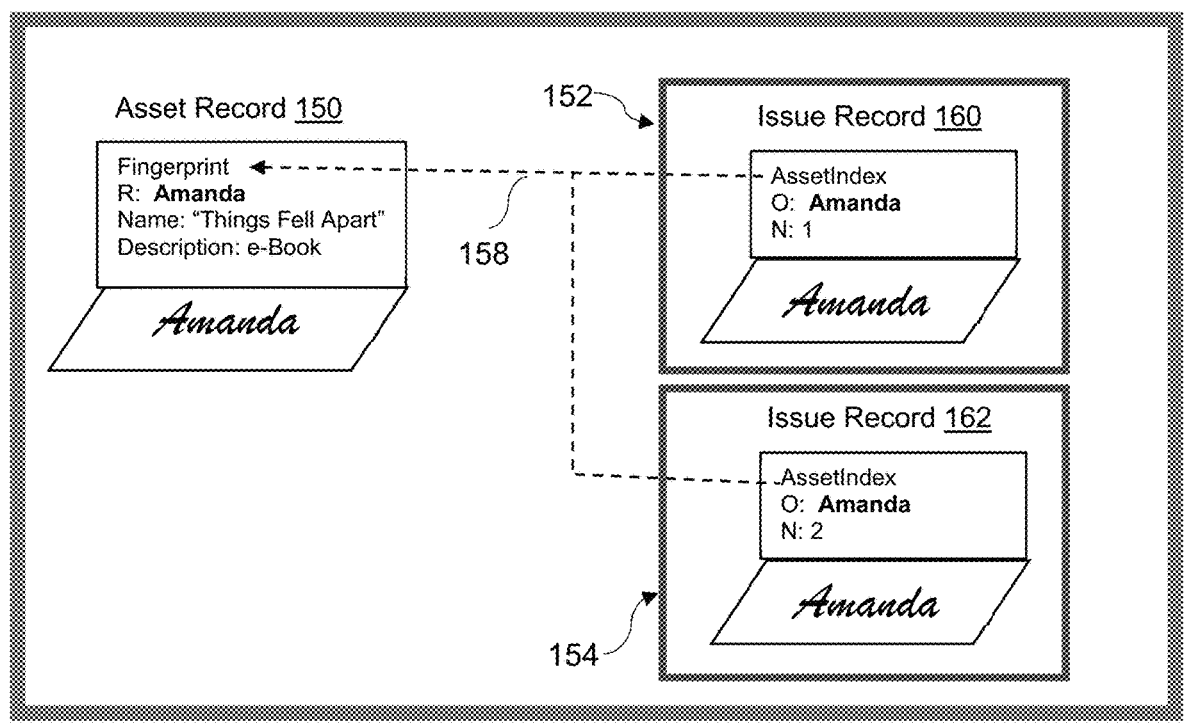
FIG. 3B is a block diagram of transactions in which bitmarks are created based on the Asset Record of FIG. 3A.

No bitmarks are actually generated in this first transaction. Bitmarks will not be created until issuances are made during the two transactions (#2 and #3) shown in FIG. 3B.

In transactions #2 and #3, Amanda issues two new bitmarks for the asset that she registered in the first transaction. These two new bitmarks 152 and 154 are created via two new Issue Records 160 and 162.

Since both new Issue Records 160 and 162 reference the same Asset Record 150 created in transaction #1, the Asset Record's Fingerprint value is hashed twice using the SHA-512 algorithm and stored in both of the new Issue Records' AssetIndex property. The value for the Owner fields of both Issue Record is Amanda's public key ("O: Amanda") because the Issue Records are automatically owned by the user who created the issuances. The Nonce ("N") fields of the Issue Records contain nonce counter values, e.g., "N: 1" and "N: 2" to ensure that each Issue Record for the same asset is unique. The each Issue Record 160 and 162 is signed at the bottom using Amanda's private key. As with Asset Records, Issue Records are always self-signed using the private key of the user who created the Issue Record. Any user can create Issue Records for an asset. There is no digital Signature Chain between the Asset Records and their corresponding Issue Records. The only connection between Issue Records 160, 162 and their corresponding Asset Records 150 is the Reference Chain 158 established by each Issue Record's Asset Index property. At this point, Amanda owns bitmarks 152 and 154.

Figure 3C:
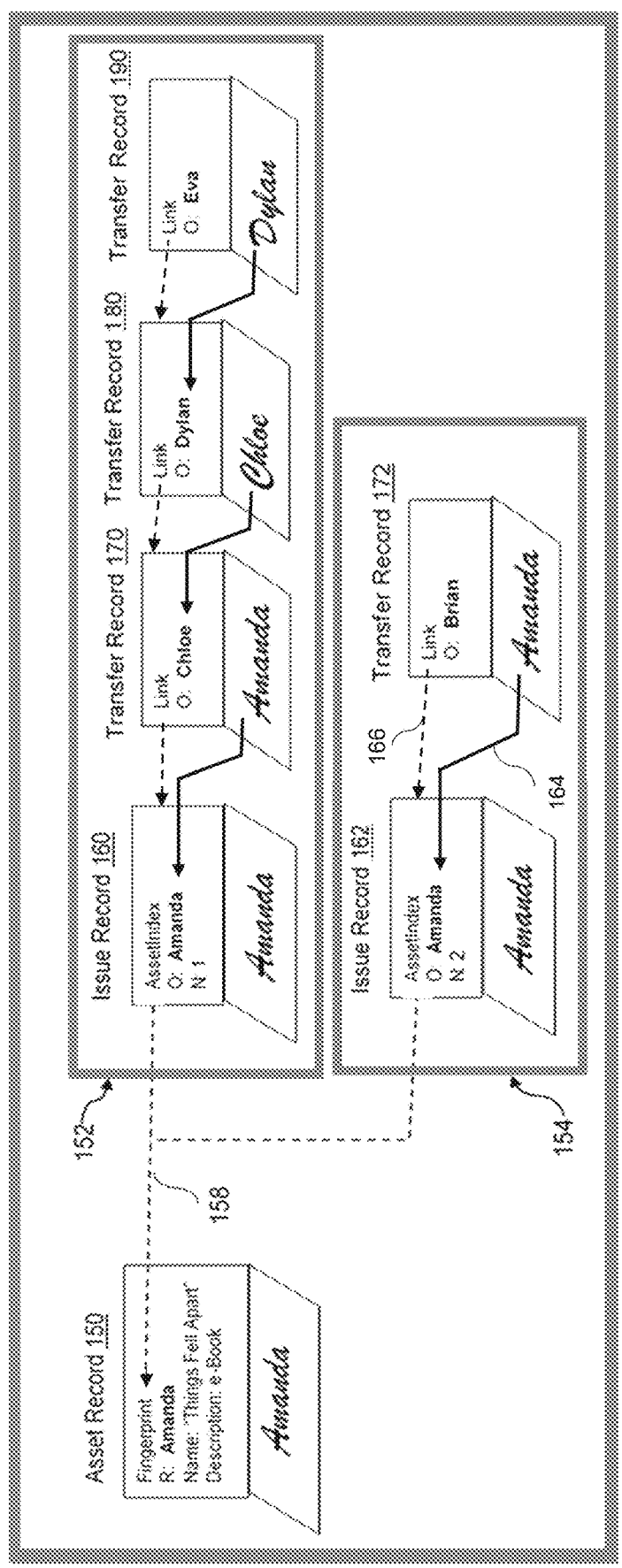
FIG. 3C is a block diagram of transactions within two bitmarks.

FIG. 3C illustrates transactions #4 through #7 for bitmarks 152 and 154. In transaction #4, Amanda transfers (sells, gifts, licenses, assigns, or other manner of property transfer) bitmark 154 to Brian. The new Transfer Record 172 lists Brian's public key as the Owner ("O: Brian"), and Amanda signs the Transfer Record 172 with her private key to authorize the transfer, as indicated by Signature Chain 164. Reference Chain 166 includes a double SHA-256 hash (32B) of the previous record.

In transaction #5, Amanda transfers bitmark 152 to Chloe, generating new Transfer Record 170, which identifies Chloe's public key and Amanda's private key along with a hash of the previous record 160. Transaction #6 records the transfer of bitmark 152 from Chloe to Dylan in Transfer Record 180. Since Chloe is now the owner, her private key is used to authorize the transfer via the Signature Chain between Transfer Records 170 and 180. In the seventh transaction, Chloe, the current owner of bitmark 152, transfers the bitmark 152 to Dylan, creating Transfer Record 190.

Transfer Records always require both a Reference Chain connection to the previous record and a Signature Chain connection to the previous record. The Reference Chain is created by calculating a double SHA-256 hash of the entire previous record, including the signature, and storing this hash in the Link field of the Transfer Record. The Link value tells the Bitmark system which record precedes a given record in a bitmark chain. Because each record includes information from the prior record, it will be traceable back to the original owner, creating an immutable provenance.

While a Transfer Record's Link field establishes a Reference Chain to the previous record, the Transfer Record's Signature value determines whether the Transfer Record is valid. If a Transfer Record's digital signature matches the previous record's Owner field (public key), the Transfer Record represents a valid bitmark transfer, and the Transfer Record is recorded in the bitmark blockchain. However, if a Transfer Record's signature value does not match the public key of the previous record's Owner, the Bitmark system's validation nodes will designate the Transfer Record "invalid" and will reject the Transfer Record from inclusion in the bitmark blockchain. In summary, the Link values create the Reference Chain for a bitmark, while the Signature values secure the Reference Chain.

Figure 3D:
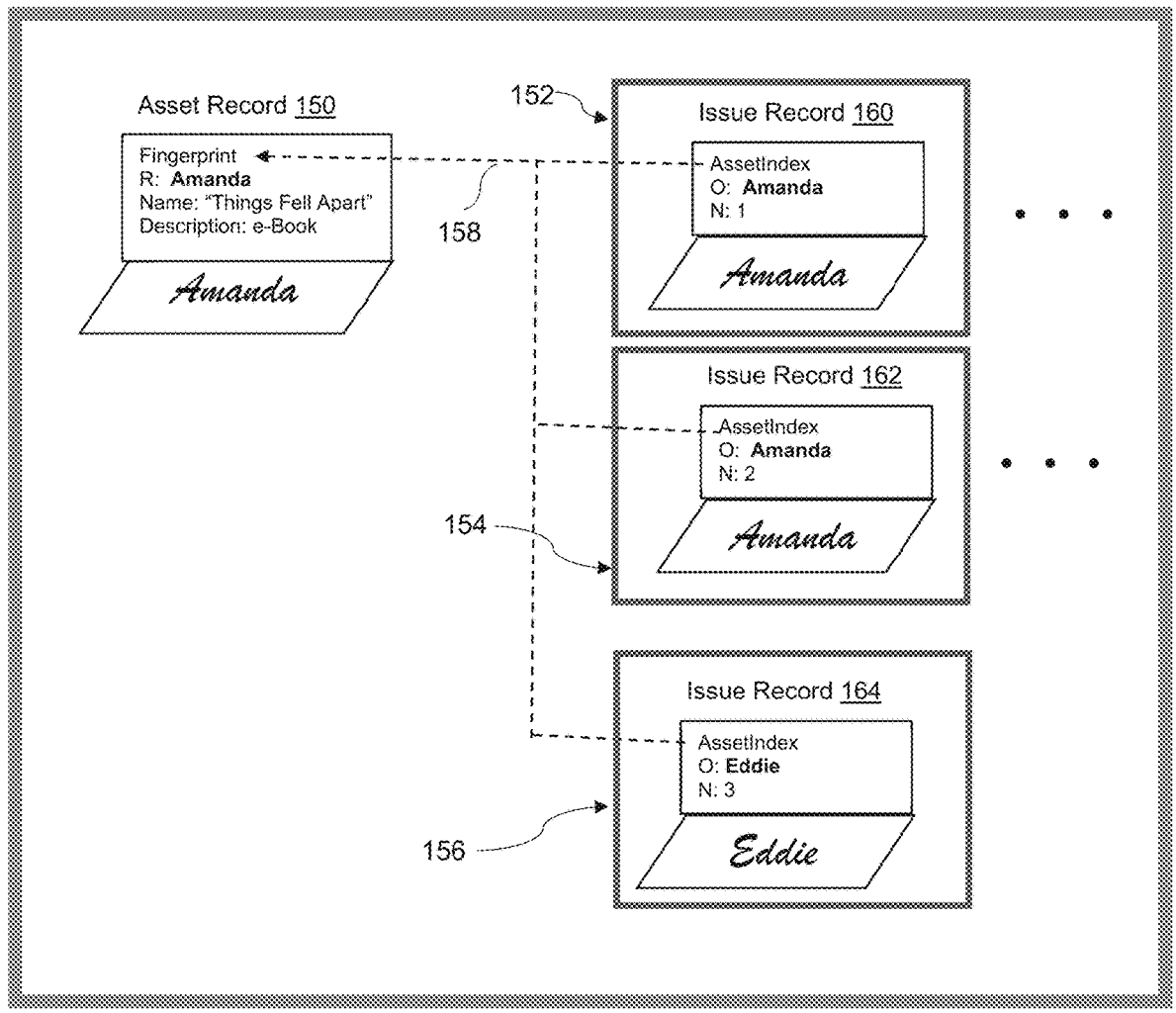
FIG. 3D is a block diagram showing issuance of an additional bitmark based on the original Asset Record of FIG. 3A.

Referring to FIG. 3D, Eddie, who also has certain rights in the asset. In keeping with the example, we can say that Eddie is Amanda's editor, and Amanda gave Freddie a certain number of copies of the e-Book out of appreciation for his assistance. Amanda provides Eddie with the Fingerprint that she created in preparation for the first transaction. Having the Fingerprint allows Eddie to log on to the Bitmark system and use the Fingerprint to issue a new bitmark 156 by creating Issue Record 164. The new Issue Record is self-signed by Eddie and the AssetIndex is again a double SHA-512 hash of the Asset Record's Fingerprint value. The Nonce ("N") fields of this new Issue Record is assigned a different nonce value (N=3) from the prior Issue Records, ensuring that each Issue Record for the same asset is unique. The new issuance by Eddie demonstrates that an Issue Record's Signature value need not match the public key of the Registrant value for the corresponding Asset Record. Any user can create an Issue Record for an asset, however, the user will need to have access to the Fingerprint generated in conjunction with the Asset Record in order for it to be associated with the original Asset Record.

The Bitmark system's user interfaces ("UI") provide for a number of different displays and access points. A user's Bitmark account is accessible by logging in via a personal computer (desktop, laptop, tablet, etc.) connected to the world wide web by going to the Bitmark website, or desktop or mobile application, and either: (1) browsing the user's device (computer, smart phone, tablet, or other) for a saved Bitmark Account ID file; (2) scanning a Bitmark Account ID (which can include scanning the screen of another device.) In some embodiments, the printed Bitmark Account ID may be provided as a scannable QR (quick response) code or other optically-readable code, including one, two or higher dimensional bar codes, color codes and/or combinations, hue values, etc. In other embodiments, the Bitmark Account ID may be the user's driver's license photo, or may be biometrically encoded, e.g., a fingerprint, hand geometry, retinal or iris patterns, facial features, etc., which can be scanned using a smart phone's camera or other scanning device, voice patterns entered using the smart phone's voice recorder, DNA, or a combination of different unique biometric characteristics of a user.

In the event a user has lost his or her Bitmark Account ID, a third method for logging into the system involves using a Bitmark Recovery Code. Such codes are typically provided to new system users when they first activate an account. If the recovery mode is initiated by entering the Recovery Code, the user will be prompted to enter a new Bitmark passphrase to be used to encrypt Bitmark data and to authorize new Bitmark transactions. The system will caution the user that their Recovery Code should not be stored on the device used to access the Bitmark system. The passphrase should preferably be printed and stored in a secure location such as a document safe or safety deposit box. A fourth option if the user's Bitmark Account ID is irretrievably lost is to create a new one.

Figure 4:
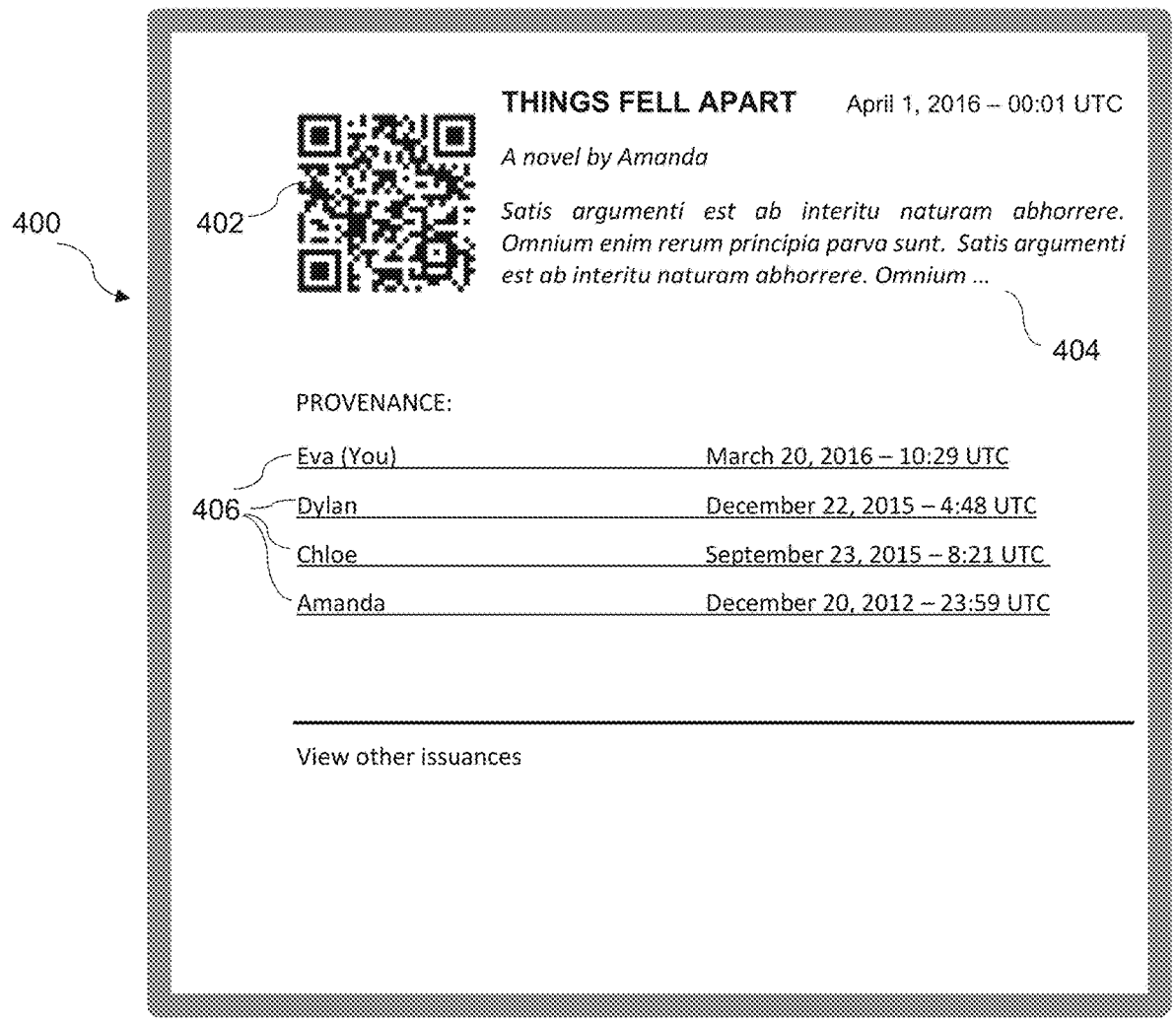
FIG. 4 is a diagram of an exemplary user interface (UI) for a sample bitmark record.
Figure 5:
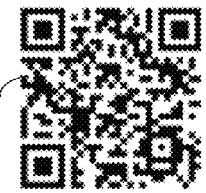
FIG. 5 is a diagram of an exemplary UI for transferring a bitmark.

Once the Bitmark user has access to his or her (or its, in the case of a business entity) account, the UIs that may be accessed include the record for a particular Bitmark—the Bitmark Record UI. FIG. 4 provides a sample Bitmark Record 400 based on bitmark 152 from FIG. 3C, which can be accessed by entering an alphanumeric code corresponding to the Bitmark Account ID, i.e., the user's private key as described above or, in some embodiments, scanning a QR code 402 for bitmark 152. (Note that the QR code is included in the figures as an illustrative example only.) The UI displays the QR code (if used), the title of the asset, a description 404 of the asset based on information provided during creation of the corresponding Asset Record 150, and the current date and time. The names and dates listed in the Record 400 comprise the "provenance". Each row 406 represents a transfer. The illustrated transfers correspond to those shown for bitmark 152 in FIG. 3C, with each row providing a link to the corresponding Account UI for the identified user, e.g., Dylan, Chloe, Amanda, with the date and timestamp when a valid transfer was completed. If the user is the current owner of the bitmark, in this case, Eva, clicking on or hovering over the top line will reveal a "transfer" button" that will take Eva to another page where the name, account number, or other identifying information can be entered for the party to whom the transfer is being made, in this example, Freddie. FIG. 5 illustrates a sample UI for initiating the transfer.

In some embodiments of the system, a transaction fee may be charged for recording each transfer. The transaction fee may be covered by a separate Bitcoin or other cryptocurrency account or by a credit/debit card account. In one embodiment, a Bitcoin wallet is embedded for each new Bitmark account. The same private key used for the Bitmark account can be used to generate Bitcoin accounts. Technically, the private key is hashed with another number (a counter) to create Bitcoin addresses. An HD (hierarchical deterministic) wallet may be implemented for this purpose. To select the form of payment for the transaction fee, the user may select a "Bitcoin" or "Credit/Debit" button on the page, which will take them to the appropriate screen for entering their payment information.

Figure 6:
FIG. 6 is a diagram of an exemplary UI after completion of the transfer of FIG. 5.

Once the payment has been confirmed, the UI will move the identity for the transferee ("Freddie") to the provenance list, indicating the transfer as "Pending" until the transfer has been validated. After validation of the transfer, the Bitmark Record 400, shown in FIG. 6, will display the provenance with the current owner of the bitmark, Freddie, at the top, along with the date and time of the transfer.

Additional user interfaces may include a history of bitmark transactions, i.e., a Transaction UI, with a list of the Bitmark transactions that have occurred for a given period of time, identifying the accounts (users) that initiated the transaction and the type of transaction that occurred, e.g., issuance or transfer, along with the status, e.g., "Pending", or, if validated, the date and time. A Navigation UI may include a searchable list of properties (assets) recorded within the Bitmark system. A typical list may include the title of the asset, the creator of the asset, the Registrant (person who created the Asset Record), the Issuer (person who created the Issue Record) and the number of bitmarks issued for that particular asset. With this capability, a person interested in acquiring one of the listed properties can click on the property to access information about the bitmark(s) to allow them to select among different owners if there are multiple bitmarks, or to provide a means for contacting a current owner to inquire into possible purchase of the property. (An owner may choose to not accept unsolicited inquiries, in which case the prospective buyer would be required to seek out another source, if any.)

An Account Record UI, accessible, for example, by clicking on the Issuer name following a search for a particular property, may include contact information for the Issuer, the Bitmark Account IDs and quantity of bitmarks associated with that Issuer, and the transaction history for that Issuer, i.e., issuances and pending and completed transfers.

The preceding example based on a digital asset that was an e-Book is provided for illustrative purposes only. As will be apparent to those in the art, the method described herein is applicable any asset, whether digital or physical. The digital assets may include, but are not limited to literary works, photographs, documents, artwork, video games, software, music, movies, or any other item that is embodied in a digital form. Physical assets will be discussed further below.

Example 2—Personal Data as Digital Assets

An area of growing interest involves the control of digital assets associated with a person's personal data, for example, photographs, videos, music or writings, which may be posted on social media or stored in cloud storage files, data collected by wearable monitoring devices such as fitness bracelets, activity trackers, heart rate, sleep and other health monitors, Internet of Things (IoT) device, among others, collectively, "Personal Data". The methods disclosed herein may be used to generate a bitmark corresponding to a person's Personal Data.

In one embodiment for controlling Personal Data, a user may incorporate features currently available from IFTTT (If This Then That) of San Francisco, Calif., a web-based service that creates chains of conditional statements called "recipes." The recipes are triggered based on changes to various applications, e.g., social media sites such as Facebook, Gmail, Instagram, Twitter and Pinterest. The IFTTT recipes trigger an action upon the occurrence of a particular trigger, for example, the user's photo being tagged in a Facebook posting, where the photo corresponds to the user's Personal Data. The occurrence of that trigger results in an action that generates a bitmark for the Personal Data, creating a Fingerprint, an Asset Record and an Issue Record for the Personal Data in the same manner as previously described for management of digital assets, to create an immutable record of the data, its origin, and its ownership. In one embodiment, the Bitmark system included an application that embeds coding to delete or redact Personal Data that is copied or otherwise used without authorization. The encryption and/or creation of a bitmark for the user's Personal Data gives the creator/issuer/owner control over usage of his or her asset (Data), and also provides a tool for monetization of the asset.

Example 3—Physical Asset Provenance

A fingerprint that can be hashed to generate an Asset Record may be created for a physical object by generating digital data unique to the physical asset. In some embodiments, the unique identifier used for a physical asset may be a physical unclonable function, or "PUF."

Many existing approaches for tracking physical objects involve applying a bar code or other encoded label to the object, which may either be affixed via adhesive or imprinted, etched or engraved on the object's surface. The digital information corresponding to the bar (or other) code may then be used to create an Asset Record in the Bitmark system to provide for creation of an immutable chain-of-title. While this may be practical for common consumer items, ranging anywhere from inexpensive consumables to prescription drugs to vehicles and other larger items, it is not appropriate for works of art, high value, few-of-a-kind items, collectables, or important original documents of legal significance, the value of which would be diminished or destroyed by attaching or imprinting a tracking code on the object.

In one embodiment of the Bitmark method, a photometric stereo method is used to extract surface textural information for one or more regions of interest ("ROI") of the physical asset. One method that may be used for this purpose is described by R. J. Woodham ("Photometric method for determining surface orientation from multiple images", Optical Engineering, 1980, which is incorporated herein by reference.) The surface texture may range from brush strokes in a painting, raised and recessed areas in a sculpture or carving, weave or grain in canvas or paper, or any other physical feature that is a permanent element of the physical asset.

Figure 7A:
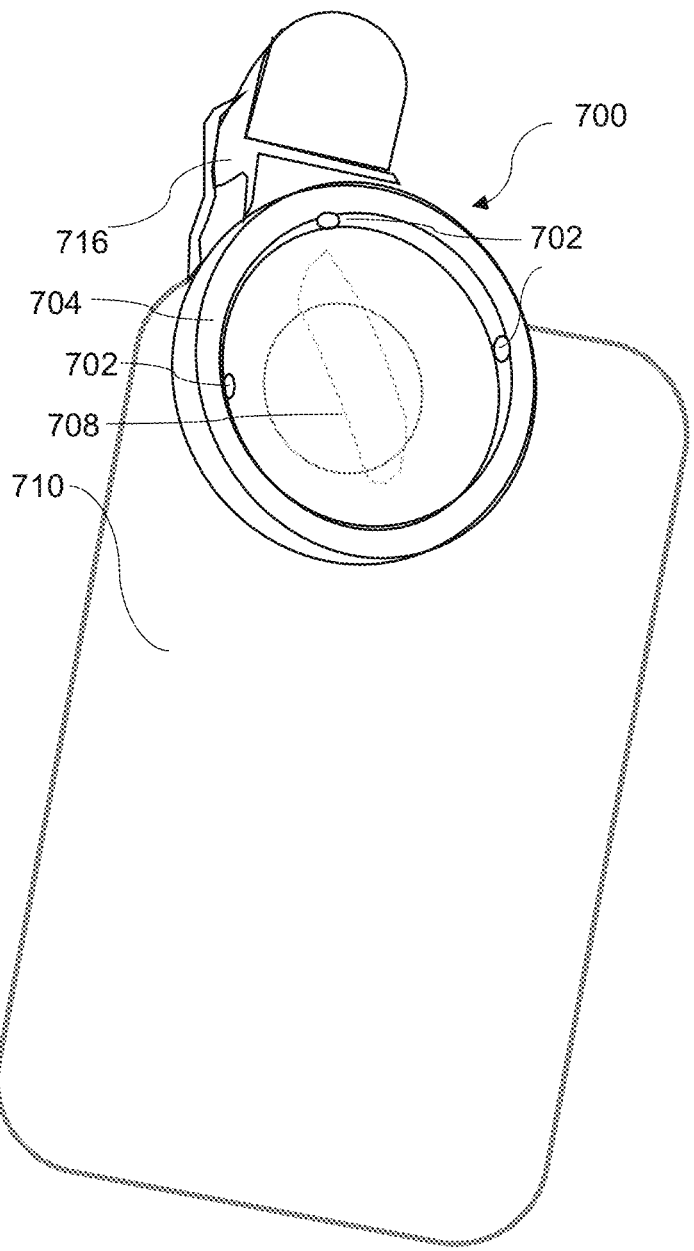
FIG. 7A is a diagrammatic view of an embodiment of a device for use in generating encoded fingerprints for physical assets.

In an exemplary embodiment illustrated in FIG. 7A, a photometric stereo device 700 includes plurality of LEDs 702 spaced uniformly around an annular support 704 that is mounted over a camera lens 706. The lens may be that of a dedicated camera intended for the specific purpose of generating digital fingerprints of physical objects, or it may be the lens 708 of a smart phone camera as shown, e.g., an iPhone, Android, or other modern smart phone 710 having high definition photo capability. In one embodiment, four (4) white light LEDs 702 mounted inside annular support 704 at 0, 90, 180, and 270 degrees in such a way that each LED can be controlled independently to permit sequential activation or activation in different combinations. (Note that only three of the four LEDs 702 are visible in the figure due to the perspective view. As will be readily apparent, any number of LEDs may be used as long as multiple angles of illumination are possible.) The mounting for attachment to the camera/phone may be a spring clip 716 as shown, a clamp, other fastener, (either temporary or permanent), or may be a housing that the smart phone is inserted into to provide additional stability. For use, the annular support 704 is stably positioned facing downward toward the object surface above the ROI. Additional mechanical support may be provided ensure uniform spacing during a complete illumination/imaging sequence in which the LEDs are sequentially activated and images collected for each angle of illumination. For example, annular support 704 may be configured to have a broad planar shape on its edge, e.g., a flange-like structure several centimeters in diameter, enabling it to lie flat on a surface to support the phone/camera good stability.

Figure 7B:
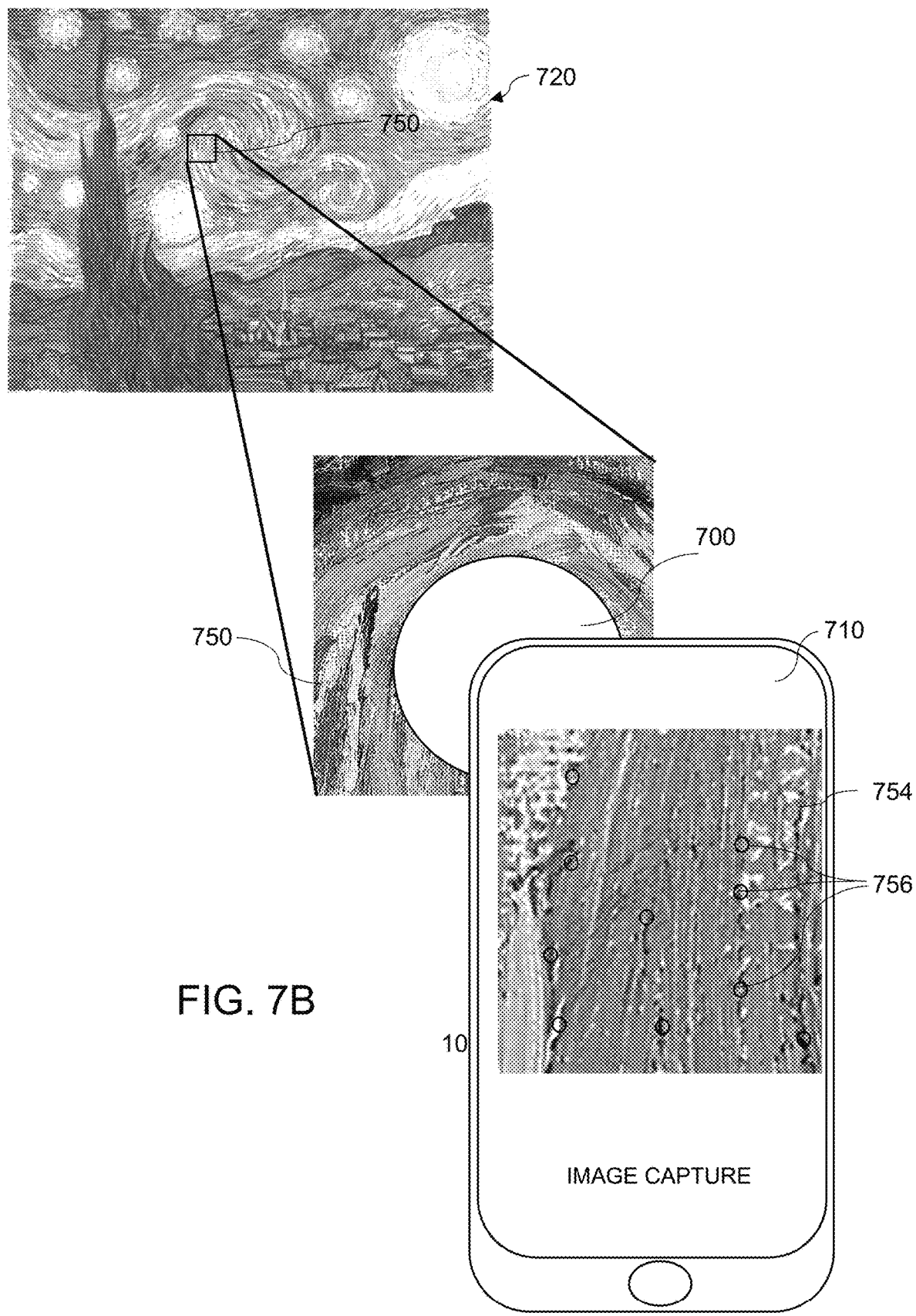
FIG. 7B illustrates a sample use of the device.

FIG. 7B illustrates a sample set-up for generating a fingerprint for van Gogh's famous painting "The Starry Night" 720. A small ROI 750 is imaged using the photometric stereo device 700 and smart phone 710 by sequentially activating multiple LEDs to illuminate the ROI from different angles and collect multiple images, which are then combined to generate a gradient image 754. Sample keypoints 756 shown in the gradient image are discussed below.

Approaches described in the prior art, for example, by Sharma, et al. ("Paperspeckle: microscopic fingerprinting of paper", *Proc. 18th ACM Conf Comput. Comm. Secur.*, pp. 99-110, 2011) and Takahashi, et al. (FIBAR: Fingerprint Imaging by Binary Angular Reflection for Individual Identification of Metal Parts", *Proc. of Fifth International Conference on Emerging Security Technologies (EST '14),* 2014, pp. 46-51), capture only one image from the ROI. In contrast, the inventive method's adoption of stereo photometric techniques produces detailed information about the surface texture, allowing the extraction of unique fingerprints for verification.

Figure 8:
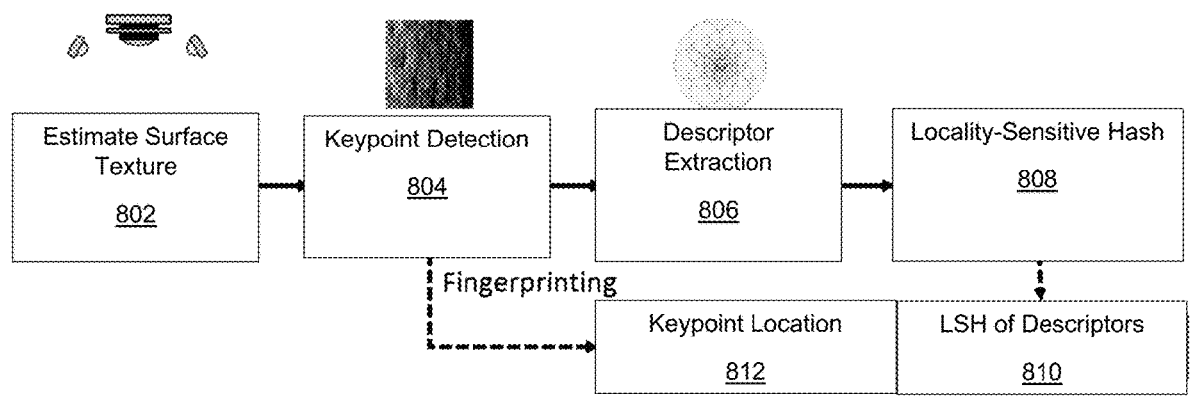
FIG. 8 is a block diagram showing the steps for creating an encoded fingerprint for a physical asset.

FIG. 8 illustrates an exemplary framework for object fingerprinting according to an embodiment of the inventive system and method. Once the gradient image, generated from a combination of images collected by sequential illumination and image capture of the ROI is derived, the local interest points (i.e., keypoints 756, examples shown in FIG. 7B) are identified and described using a machine vision algorithm such as FAST (E. Rosten et al. "Faster and better: a machine learning approach to corner detection", *IEEE Trans. Pattern Analysis and Machine Intelligence (PAMI'10)*, 32(1), 105-119, 2010, incorporated herein by reference) or FREAK (A. Alahi et al., "FREAK: Fast Retina Keypoint", In *Proc. of 2012 IEEE Conference on Computer Vision and Pattern Recognition (CVPR'12)*, Jun. 16-21, 2012, pp. 510-517, incorporated herein by reference.)

The use of random projection and locality-sensitive hashing allows the encoding of the extracted descriptors and reduction of the feature dimensions. As a result, only compact information will be required to be stored, processed, and matched. In a particularly preferred embodiment, fewer than 300 keypoints are obtained for each ROI, while each descriptor requires only 64 bits. Adding the locations of the keypoints results in a fingerprint size for the ROI that is only about 25K bits.

Referring to FIG. 8, in step 802, for each ROI, four separate images are taken using with lighting from four different horizontal and vertical directions (i.e., 0, 90, 180, and 270 degrees). Using photometric stereo techniques, the resulting gradient image can be derived to describe the surface textural information. In step 804, a keypoint detector such as FAST is applied to the image to identify the local interest points of the ROI (fewer than 300). Keypoints can include distinctive features such as corners, edges, possibly scratches and imperfections, etc. A binary descriptor is then applied to the local interest points to describe the region around each keypoint as a feature vector. Binary descriptors, as are known in the field of computer vision, are used to capture and encode image information as a binary string. These descriptors can be computed very quickly and provide for application of metrics such as Hamming distance with XOR operation for verification, making it computationally efficient. A number of different binary descriptors are publicly available, including BRIEF, ORB, BRISK, and FREAK. For purposes of the exemplary embodiment, each of the local interest points was described in step 806 using a FREAK descriptor.

In step 808, a random projection is applied on each descriptor with locality-sensitive hashing to reduce each descriptor to a 64-bit binary string. The collection of the binary strings for all descriptors (810) and the keypoint location (812) forms a set of unique minutiae that represents an object's fingerprint. These fingerprints may be saved in a gallery maintained by the object's owner for use in later authentication of the object. Preferably, the fingerprint will be used to create an Asset Record for creation of a Bitmark chain through which provenance may be established. For authentication of the object at some later time by a prospective purchaser, the fingerprint generated for a query image of the object obtained using the photometric stereo device described above, e.g., in step 802, can be compared against the fingerprint in the Bitmark chain.

To evaluate the performance of the verification process, ten different art paper samples of the same material were used. For each paper type, in addition to unmodified paper, two different tampering processes, rubbing and soaking, were performed before acquiring a gradient image to make the verification task more practical yet difficult. The rubbing process involves vigorously rubbing the paper with an eraser, whereas the soaking process involves soaking the paper in water for an hour.

For each condition (untampered, rubbed, and soaked) of each paper sample, two gradient images were captured separated by a time interval. Thus, a total of 10×3×2=60 samples were available for verification testing. This results in 360 genuine pairs corresponding to different tampering conditions of the same piece of art paper, while 3240 imposter pairs can be obtained. To compare against the performance of existing methods, the baseline method was considered using only a single photographic (non-gradient) image for the ROI, with the use of the same descriptors for matching.

Figure 9A:
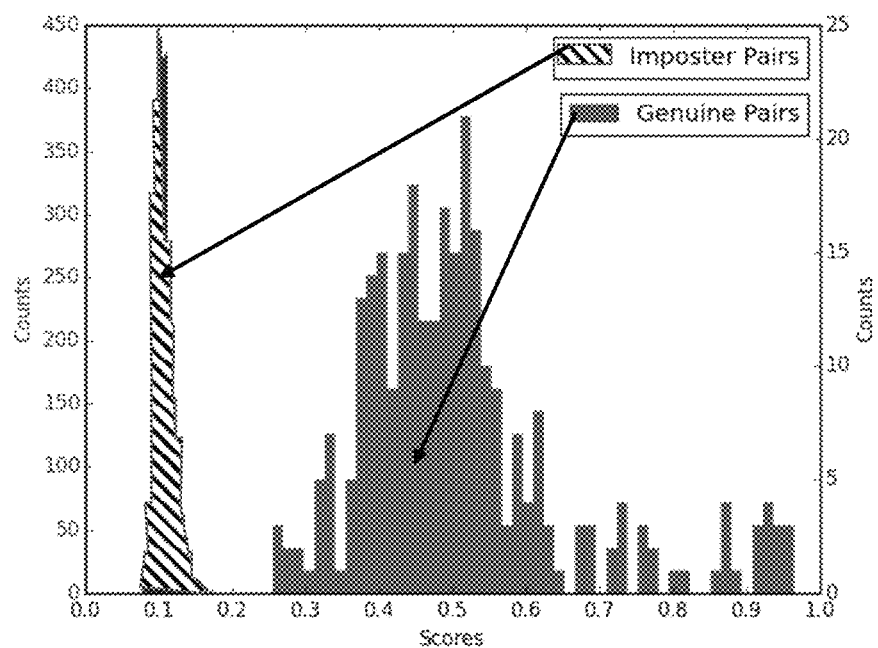
FIGS. 9A-9C provide a comparison of score distributions achieved using an embodiment of the photometric stereo approach to physical object fingerprinting (FIG. 9A) and a baseline approach (FIG. 9B)
Figure 9B:
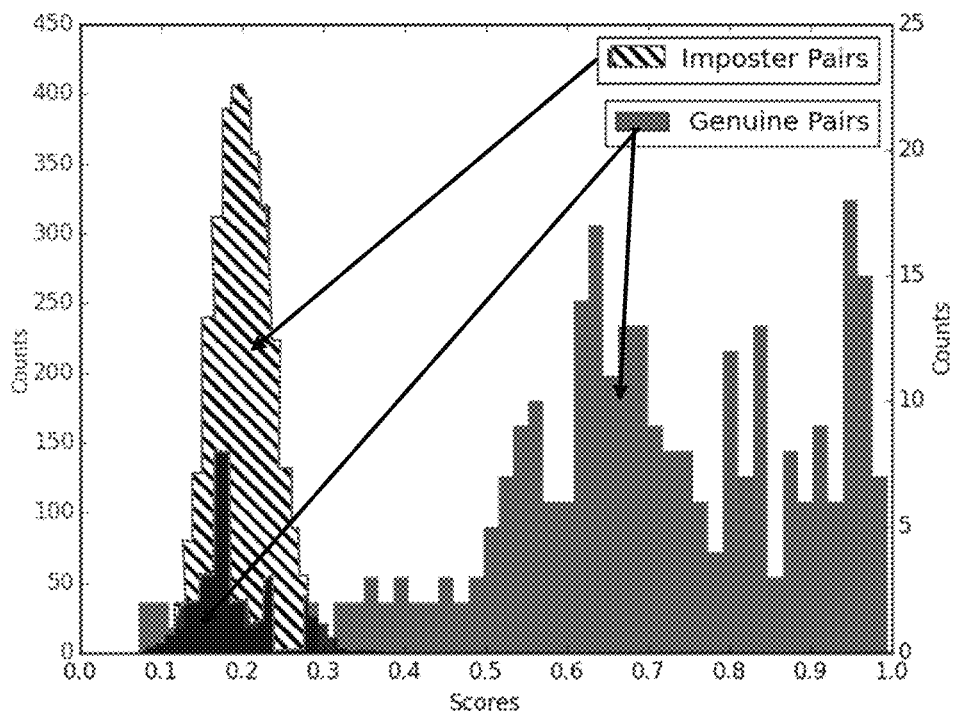
Figure 9C:
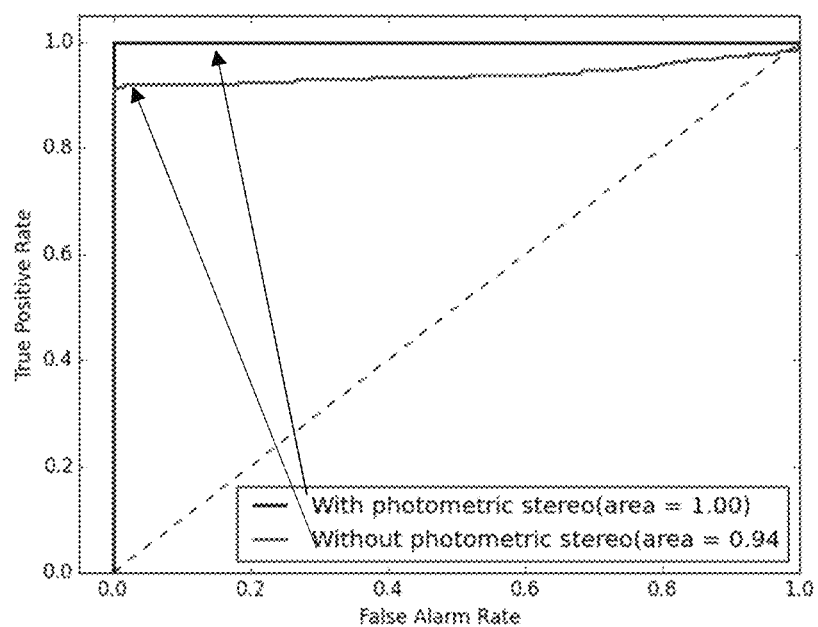

FIGS. 9A and 9B show the matching score distributions for the genuine and imposter pairs using the photometric stereo and baseline approaches, respectively. As indicated, the inventive approach was able to distinguish between genuine and imposter pairs, while the baseline approach failed to do so. FIG. 9C compares the ROC curves (i.e., true positive rate (TPR) vs. false alarm rate (FAR)), confirming the effectiveness of the photometric stereo approach. It is worth noting that, the inventive approach does not require precise alignment when extracting the object fingerprints. This is due to the use of robust keypoint descriptors. Another advantage is that, with LSH techniques noted above, the size of the encoded fingerprints is only about 25K bits. As a result, the inventive framework is not only applicable for offline verification tests, but also prevents possible forgery of the object of interest using encoded fingerprints.

The creation of a fingerprint

Example 4—Network Functionality

The following discussion assumes familiarity with Nakamoto blockchains. Background information is publicly available on the World Wide Web at Bitcoin wiki, which is incorporated herein by reference.

Figure 10:
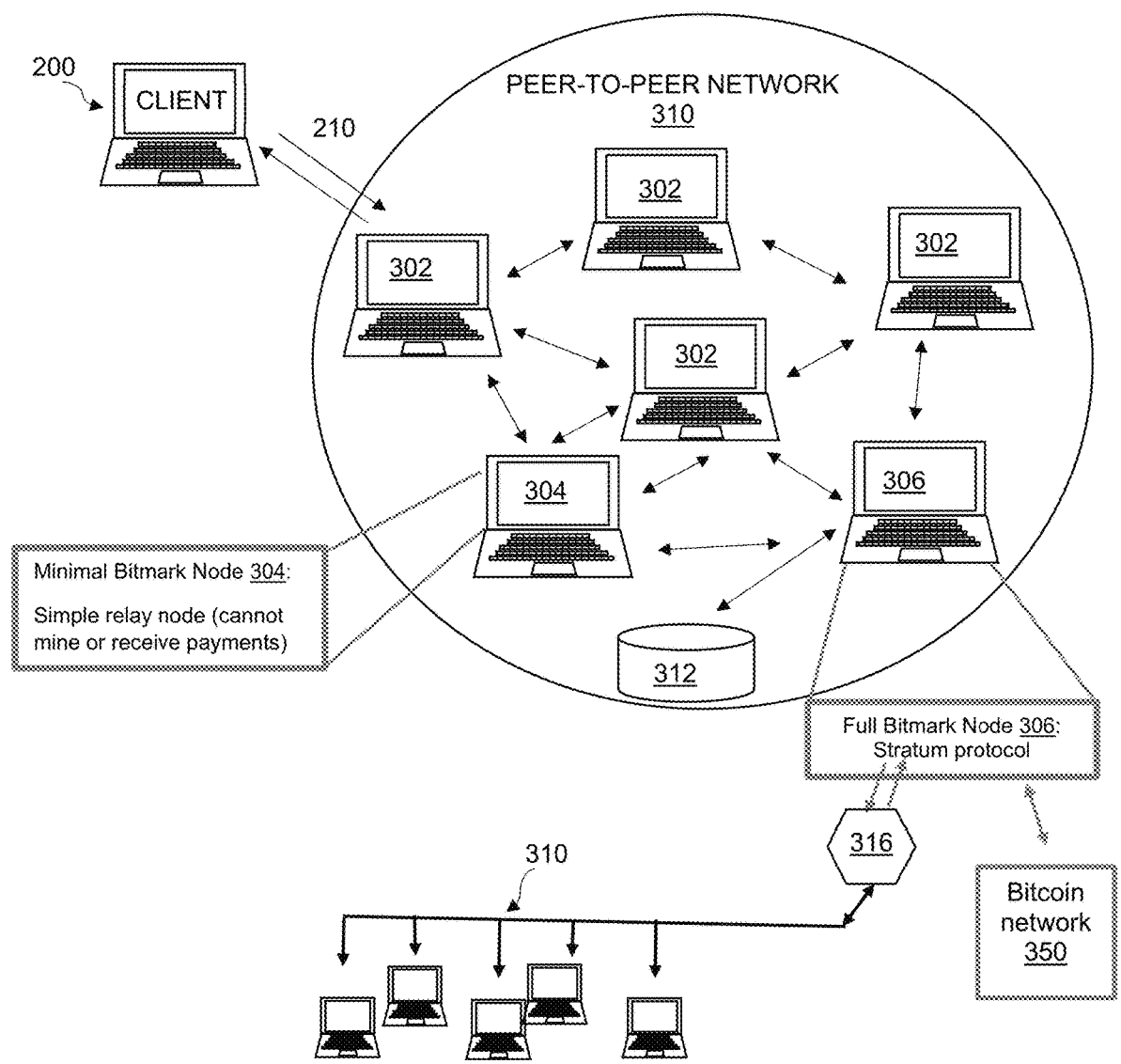
FIG. 10 is a diagram of an exemplary network environment for implementation of an embodiment of the inventive system.

FIG. 10 illustrates the high-level functionality of the Bitmark system, which creates and processes transactions through the Bitmark peer-to-peer ("P2P") network 310. Bitmark client 200, which includes software for executing the client user interface (UI), uses a widely-used remote procedure call (RPC) protocol 210, e.g., JSON-RPC, to connect to a port server of Bitmark node 304, referred to as "bitmarkd," to send out transactions. The Bitmark client 200 handles key generation and storage, while the bitmarkd server acts as a JSON-RPC listener for client transaction submission, blockchain generation and signature verification. The Bitmark system uses a custom P2P binary protocol for blockchain and transaction broadcasting. Full Bitmark node 306 includes a JSON-RPC listener for administration commands and a Stratum protocol listener 316 for miners 302 in P2P network 310. Data is stored in LevelDB database 312.

The client 200 connects to bitmarkd's RPC port 304 and sends the transaction as a JSON-RPC request 210. The bitmarkd server verifies the signature of the transaction. As previously described, Asset Records and Issue Records are self-signed, whereas Transfer Records must be signed by the previous owner. Invalid signatures and incorrectly linked records are rejected. Valid transactions are pooled as unpaid items and broadcast to other servers in the peer-to-peer network.

For each unpaid transaction, the bitmarkd server will return a transaction ID and an array of payment pairs, e.g., currency names and payment addresses, which the network will accept as payment for mining the transaction (the "fee".) Provisions may be made to pay for multiple transactions in a single payment by including multiple-outputs and scaling the required fees. Using the transaction information provided by the bitmarkd server, the client completes a payment transaction and sends it to bitmarkd for verification and relay. In another embodiment, the client may pay directly, and the bitmarkd server will monitor all currencies it supports to determine whether payment has been made. Servers can wait for a fixed period of time, e.g., up to one hour, for payment to be received before expiring the record. Once payment is confirmed, the record(s) can be mined.

Still referring to FIG. 10, Bitmark's blockchain has a structure similar to the Bitcoin blockchain. In one embodiment, the Bitmark and Bitcoin blockchains may share the same proof-of-work algorithm. In other embodiments, the Bitmark blockchain may use a different algorithm. Regardless of the use of shared technology, the Bitmark system establishes its own blockchain, independent of Bitcoin or other cryptocurrency, so there is no limitation that Bitcoin be used as the associated crypto-currency for transactions. The following description of interaction with the Bitcoin system is provided as one of the possible mechanisms for transferring payments and is not intended to suggest that the Bitmark system is dependent on the Bitcoin cryptocurrency system.

Following the Bitcoin model, mining is performed is to ensure that all participants have a consistent view of the Bitmark data. Because Bitmark is a distributed peer-to-peer system, there is no central database to keep track of who owns Bitmarks. Instead, the log of all transactions is distributed across the peer-to-peer network. Outstanding Bitmark transactions are mined into a block of transactions to make them official. Conflicting or invalid transactions aren't allowed into a block, so the problem of duplicate transfers is avoided.

The mining process itself is external to the bitmarkd server and uses the Stratum mining protocol, as is known in the art. The bitmarkd server creates a dummy Bitcoin header with an embedded record hash enabling existing mining software (e.g., cgminer (Con Kolivas, "A multi-threaded multi-pool FPGA and ASIC miner for bitcoin") to mine Bitmark blocks as if they were Bitcoin blocks. The server accumulates available transactions into a list and computes a partial Merkle tree of transaction digests. (This partial Merkle tree lacks a coinbase digest.) A check is made for issue records to ensure that an asset record will be included before the issue record (i.e., the related asset either has been mined in a previous block or is known to the bitmarkd).

A partial coinbase containing a block number, a 64-bit timestamp, and a payment address is created and is submitted along with the partial Merkle tree to the Stratum server 316. Miners 302 connect to the Stratum ports to receive this data. If a miner is successful, it will return the nonce values it found. Bitmarkd will then create the full header and coinbase along with the full Merkle tree and verify that the digest is within the current difficulty and higher than the current block number. Blocks that meet both conditions are incorporated into the current blockchain.

A Bitmark coinbase is compatible with a Bitcoin coinbase and contains one input and one or more outputs. The input script contains a series of push data operations, which are listed below. The input and output scripts cause the coinbase not to function as a real Bitcoin transaction since the scripts consist of OP_RETURN operations.

The data stored in the input and output transactions are listed in Table 1:

TABLE 1

| Data | Description |
| --- | --- |
| Input | |
| Block Number | 2..8 bytes, little-endian (up to 64 bits) |
| Timestamp | 4..8 bytes, little-endian (UTC Unix time in seconds up to 64 bits) Payment |
| Extra Nonce | 8..16 bytes, for Stratum server and miner to use The data stored in each output includes Currency Name and Payment Address |
| Output | |
| Currency Name | 0..16 bytes, lowercase ASCII currency name (e.g.: "bit- coin") |
| Payment Address | 0..64 bytes, ASCII address of miner to receive payment (e.g.: Base58 Bitcoin address) [each output stores a pair of these to allow for multiple currency support] |

When a bitmarkd server receives additional transactions, it will periodically assign new work to the miner and submit it to the Stratum server. A correctly solved Bitmark block will have all of its transactions set to a mined state, thus removing them from the available pool. The Stratum server is then reset and continues to work with the remaining available transactions.

Mining will be suspended and the server will go into recovery mode until the pools of available transactions have been fully reconstructed if any of the following conditions occurs:

1. a new block is created with a number higher than the current blockchain;
2. the server was offline for a time (or just missed some blocks);
3. the blockchain forks The server recovers by determining the highest available block from neighbors and then fetches blocks in reverse order, overriding any older blocks until its blockchain is consistent with neighboring blockchains.

Once all blocks have been received and their corresponding transactions have been set to "mined", mining can resume. The fetching of any missing transactions can be a background process and would not affect current mining.

It is possible to verify the current owner of any bitmark within the system without running a full network node. Servers internally maintain a table of the current owners for each bitmark and thus can verify ownership requests from clients with an easy lookup query.

There are vulnerabilities to this method. Among other concerns, this method is only reliable if honest nodes control the network. Therefore, actors that frequently transfer or receive bitmarks should run their own full nodes. Running full local nodes is also better for independent security and faster verification.

The incentive to mine is funded with transaction fees—payable in currencies such as Bitcoin or other cryptocurrency—and also helps prevent abuse of the system. The transaction fee is the difference between the output value of a payment transaction and its input value.

By necessity, the system announces all transactions publicly. Privacy can still be maintained by keeping public keys anonymous. As an additional precaution, a new key pair can be used for each transaction to prevent linking back to a common owner.

Owners may wish to reveal their identity within the system. Institutions such as museums often want their holdings known. A public key infrastructure (PKI) can be used by clients to verify that a particular public key belongs to a certain entity.

Money presupposes property, except in the case where a decentralized system is desired. Under existing approaches, to avoid reliance on centralized system, one requires peer-to-peer money before it becomes possible to transfer property without a central authority. On the other hand, it is not necessarily desirable to be limited to the use of a specific peer-to-peer crypto-currency system when seeking to transfer property. Clearly, not all parties who might be interested in buying or selling property wish to be limited to a single form of payment.

The method and system described herein provide a trust-free method to build a global property system that is enforced by protocol and employs a Nakamoto blockchain to create unforgeable provenance. The architecture shares key technical aspects with Bitcoin to enable decentralized payment and leverage mining resources, while remaining independent of Bitcoin or other crypto-currency systems Bitmarks provide transparency through digital signatures in a way that is internationally-verifiable, yet locally enforceable. Because the system does not distinguish between properties (physical or digital) or owners (individual, institution, or machine), ownership can be extended far beyond the limits of current property systems.

While the foregoing written description contains many specifics, these should not be construed as limitations on the scope of the invention or of what may be claimed, but rather as descriptions of features specific to particular embodiments or examples of the invention. Certain features that are described in this specification in the context of separate embodiments or examples can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The invention claimed is:

1. A computerized method for creating and maintaining a decentralized record of ownership rights in an asset, the method comprising:
   providing a peer-to-peer network comprising a plurality of miners, a node server, and a Stratum server;
   providing at least one user interface to the node server, wherein the at least one user interface is configured for generating an asset record having a fingerprint comprising a hash of a digital representation of the asset, a public key of a creating client who creates the asset record, and a digital signature comprising a private key of the creating client;
   submitting the assert record to the node server to generate an entry in a public ledger by performing the steps of:
      generating at least one issue record comprising a double hash of the fingerprint, the public key of the creating client, and an owner signature comprising a hash of the digital signature of the creating client with the double hashed fingerprint and the public key of the creating client;
      entering the at least one issue record into the public ledger, wherein the public ledger comprises a crypto-currency-independent blockchain, and wherein the public ledger comprises a searchable list of assets accessible via the network; and
   providing public access to the public ledger via the network, wherein a query received from a requester's user interface generates a response to the requester's user interface, the response comprising at least a provenance of the asset and an identity of a current owner.

2. The method of claim 1, wherein the asset is digital property.

3. The method of claim 2, wherein the digital property is selected from the group consisting of music, video, electronic books and literary works, digital photographs, music, artwork, software, video games, documents, digital images, and personal data.

4. The method of claim 1, wherein the asset is physical property, and further comprising generating a digital fingerprint corresponding to the physical property using a local image of a region of interest on a surface of the physical property.

5. The method of claim 4, wherein the local image is a photometric stereo image.

6. The method of claim 5, further comprising using the computing device for:
   identifying local interest points within the photometric stereo image using a keypoint detector; and
   encoding the local interest points as a binary string using a binary descriptor; wherein the binary string comprises the digital representation of the asset.

7. The method of claim 1, further comprising:
   generating a first transfer record for recording a transfer of the asset to a new owner, wherein the transfer record comprises a double hash of a complete issue record for the asset and a public key of the new owner, wherein the transfer record is digitally signed by the owner signature;
   communicating the first transfer record to the node server;
   initiating via the at least one Stratum server a blockchain algorithm to generate a distributed consensus of ownership of the asset associated with the owner signature to validate the first transfer record; and
   if the first transfer record is validated, entering the transfer record on the public ledger; and
   if the first transfer record is not validated, rejecting the transfer record.

8. The method of claim 7, further comprising, after the step of generating the first transfer record:
   displaying at the user interface a payment request;
   determining whether a user payment has been remitted before proceeding with the step of initiating.

9. The method of claim 7, wherein the double hash of the complete issue record comprises a SHA-256 hash to generate a 32 byte Link.

10. The method of claim 7, further comprising:
    generating a subsequent transfer record for recording a transfer from a prior owner to a subsequent new owner, wherein the subsequent transfer record comprises a double hash of a prior transfer record, and a public key of the subsequent new owner, wherein the subsequent transfer record is digitally signed by the prior owner;
    communicating the subsequent transfer record to the node server;
    initiating via the at least one Stratum server a blockchain algorithm to generate a distributed consensus of ownership of the asset associated with the owner signature to validate the subsequent transfer record; and if the subsequent transfer record is validated, displaying the subsequent transfer record on the public ledger; and if the subsequent transfer record is not validated, rejecting the subsequent transfer record.

11. The method of claim 10, further comprising, after the step of generating the subsequent transfer record:

displaying at the user interface a payment request; and determining whether a user payment has been remitted before proceeding with the step of initiating.

12. The method of claim 10, wherein a combination of the at least one issue record and one or more of the first transfer record and the subsequent transfer record comprises an immutable provenance for the asset traceable to an original owner.

13. The method of claim 1, wherein the at least one issue record comprises multiple issue records, and wherein each issue record includes a different nonce.

14. The method of claim 13, wherein each issue record is associated with a separate blockchain.

15. The method of claim 1, wherein the double hash of the fingerprint comprises a SHA-512 hash to generate a 64 byte AssetRecord.

16. The method of claim 1, wherein the at least one user interface is a desktop or laptop computer connected to the web, or a mobile device.

17. A computerized method for creating and maintaining a decentralized record of ownership rights in a digital asset, the method comprising:

providing access within a peer-to-peer network to a plurality of miners, a node server, and a Stratum server;

providing at least one user interface to the node server, wherein the at least one user interface is configured for generating an asset record having a fingerprint comprising a hash of a digital representation of the digital asset, a public key of a creating client who creates the asset record, and a digital signature comprising a private key of the creating client;

submitting the assert record to the node server to generate an entry in a public ledger by performing the steps of:

generating at least one issue record comprising a double hash of the fingerprint, the public key of the creating client, and an owner signature comprising a hash of the digital signature of the creating client with the double hashed fingerprint and the public key of the creating client;

entering the at least one issue record into the public ledger, wherein the public ledger comprises a cryptocurrency-independent blockchain, and wherein the public ledger comprises a searchable list of digital assets accessible via the network; and providing public access to the public ledger via the network, wherein a query received from a requester's user interface generates a response to the requester's user interface, the response comprising at least a provenance of the digital asset and an identity of a current owner.

18. The method of claim 17, further comprising:

generating a first transfer record for recording a transfer of the digital asset to a new owner, wherein the transfer record comprises a double hash of a complete issue record for the digital asset and a public key of the new owner, wherein the transfer record is digitally signed by the owner signature;

communicating the first transfer record to the node server;

initiating via the at least one Stratum server a blockchain algorithm to generate a distributed consensus of ownership of the digital asset associated with the owner signature to validate the first transfer record; and if the first transfer record is validated, entering the transfer record on the public ledger; and if the first transfer record is not validated, rejecting the transfer record.

19. The method of claim 18, further comprising:

generating a subsequent transfer record for recording a transfer from a prior owner to a subsequent new owner, wherein the subsequent transfer record comprises a double hash of a prior transfer record, and a public key of the subsequent new owner, wherein the subsequent transfer record is digitally signed by the prior owner;

communicating the subsequent transfer record to the node server;

initiating via the at least one Stratum server a blockchain algorithm to generate a distributed consensus of ownership of the digital asset associated with the owner signature to validate the subsequent transfer record; and if the subsequent transfer record is validated, displaying the subsequent transfer record on the public ledger; and if the subsequent transfer record is not validated, rejecting the subsequent transfer record.

20. The method of claim 19, further comprising, after the step of generating either the first transfer record or the subsequent transfer record:

displaying at the user interface a payment request; and determining whether a user payment has been remitted before proceeding with the step of initiating.

21. The method of claim 19, wherein a combination of the at least one issue record and one or more of the first transfer record and the subsequent transfer record comprises provenance for the asset traceable to an original owner.

* * * * *